(12) United States Patent
Nichol et al.

(10) Patent No.: US 10,191,199 B2
(45) Date of Patent: Jan. 29, 2019

(54) DISPLAY INCLUDING A FILM LIGHTGUIDE BENT AROUND A GUIDE ELEMENT

(71) Applicant: FLEx Lighting II, LLC, Chicago, IL (US)

(72) Inventors: Anthony Nichol, Chicago, IL (US); Zane Coleman, Elmhurst, IL (US)

(73) Assignee: Flex Lighting II, LLC, Chicago, IL (US)

( * ) Notice: Subject to any disclaimer, the term of this patent is extended or adjusted under 35 U.S.C. 154(b) by 0 days.

(21) Appl. No.: 15/618,336

(22) Filed: Jun. 9, 2017

(65) Prior Publication Data

US 2017/0285243 A1  Oct. 5, 2017

Related U.S. Application Data

(63) Continuation of application No. 14/207,045, filed on Mar. 12, 2014, now Pat. No. 9,690,032.

(60) Provisional application No. 61/777,632, filed on Mar. 12, 2013.

(51) Int. Cl.
*F21V 8/00* (2006.01)
*G02F 1/1335* (2006.01)

(52) U.S. Cl.
CPC ......... *G02B 6/0035* (2013.01); *G02B 6/0045* (2013.01); *G02B 6/0025* (2013.01); *G02B 6/0031* (2013.01); *G02B 6/0033* (2013.01); *G02B 6/0051* (2013.01); *G02B 6/0058* (2013.01); *G02F 1/133606* (2013.01)

(58) Field of Classification Search
CPC .. G02B 6/0035; G02B 6/0045; G02B 6/0025; G02B 6/0031; G02B 6/0033; G02B 6/0051; G02B 6/0058; G02B 6/0063; G02B 6/0065; G02B 6/0028; G02F 1/133606; G02F 1/133602; G02F 1/1336; G02F 1/133607
USPC .............. 385/31–32, 129–130; 362/600–629
See application file for complete search history.

(56) References Cited

U.S. PATENT DOCUMENTS

| 7,066,634 B2 | 6/2006 | Kitamura | |
| 7,343,060 B2 * | 3/2008 | Ohtsu | G02B 6/02042 385/129 |
| 7,570,846 B2 * | 8/2009 | Meir | G02B 6/04 385/15 |

(Continued)

FOREIGN PATENT DOCUMENTS

| JP | 2001305540 A | 10/2001 |
| KR | 20060057583 A | 5/2006 |

*Primary Examiner* — Thomas A Hollweg
(74) *Attorney, Agent, or Firm* — Zane Coleman

(57) ABSTRACT

In one aspect, a display comprises a light source, a film-based lightguide with a light emitting region positioned adjacent to and directing light to an active area of a spatial light modulator in a thickness direction. The film may have a light mixing region positioned between a light input region and the light emitting region. In one aspect the display comprises a guide element having a surface curved in a first plane positioned along a first edge of the spatial light modulator, wherein the film is folded along the curved surface at a first fold such that the first fold positions a portion of the light mixing region above or below the active area, the light mixing region comprises the first fold, and an inner surface of the film in the light mixing region is in contact with and curved along the curved surface of the guide element.

20 Claims, 6 Drawing Sheets

(56) References Cited

U.S. PATENT DOCUMENTS

| | | | |
|---|---|---|---|
| 7,810,977 B2 | 10/2010 | Ueyama | |
| 8,750,671 B1* | 6/2014 | Kelly | F21V 3/049 362/335 |
| 8,761,565 B1* | 6/2014 | Coleman | F21V 5/002 362/335 |
| 8,917,962 B1* | 12/2014 | Nichol | G02B 6/0028 362/296.01 |
| 9,287,336 B2* | 3/2016 | Lin | H01L 27/3244 |
| 9,566,751 B1 | 2/2017 | Nichol et al. | |
| 9,651,729 B2* | 5/2017 | Nichol | G02B 6/0036 |
| 9,690,032 B1* | 6/2017 | Nichol | G02B 6/0035 |
| 2003/0174953 A1* | 9/2003 | Carnevale | G02B 6/4472 385/39 |
| 2007/0025672 A1* | 2/2007 | Suzuki | G02B 6/10 385/129 |
| 2007/0081344 A1 | 4/2007 | Cappaert | |
| 2007/0183730 A1 | 8/2007 | Morimoto et al. | |
| 2007/0258267 A1 | 11/2007 | Huang | |
| 2009/0091836 A1* | 4/2009 | Mi | G02B 6/0053 359/599 |
| 2010/0021109 A1* | 1/2010 | Ohtsu | G02B 6/43 385/31 |
| 2010/0021119 A1* | 1/2010 | Ohtsu | G02B 6/10 385/130 |
| 2010/0212719 A1* | 8/2010 | Stolum | F24J 2/067 136/246 |
| 2010/0246200 A1 | 9/2010 | Tessnow | |
| 2011/0085771 A1* | 4/2011 | Matsuyama | G02B 6/43 385/125 |
| 2011/0187964 A1 | 8/2011 | Li et al. | |
| 2011/0249425 A1 | 10/2011 | Aurongzeb | |
| 2011/0273906 A1* | 11/2011 | Nichol | G02B 6/0076 362/607 |
| 2012/0212414 A1* | 8/2012 | Osterhout | G02B 27/017 345/158 |
| 2012/0287674 A1* | 11/2012 | Nichol | G02B 6/0018 362/611 |
| 2015/0049285 A1* | 2/2015 | Qian | G02B 6/0073 349/106 |
| 2016/0218156 A1* | 7/2016 | Shedletsky | G06F 1/1637 |
| 2017/0045669 A1 | 2/2017 | Nichol et al. | |
| 2017/0205572 A1 | 7/2017 | Nichol et al. | |
| 2017/0235036 A1 | 8/2017 | Nichol et al. | |
| 2018/0052274 A1 | 2/2018 | Nichol et al. | |
| 2018/0059318 A1 | 3/2018 | Nichol et al. | |

* cited by examiner

DISPLAY INCLUDING A FILM LIGHTGUIDE BENT AROUND A GUIDE ELEMENT

TECHNICAL FIELD

The subject matter disclosed herein generally relates to lightguides, films, and light emitting devices such as, without limitation, light fixtures, backlights, frontlights, light emitting signs, passive displays, and active displays and their components and methods of manufacture.

BACKGROUND

Conventionally, in order to reduce the thickness of displays and backlights, edge-lit configurations using rigid lightguides have been used to receive light from the edge of and direct light out of a larger area face. These types of light emitting devices are typically housed in relatively thick, rigid frames that do not allow for component or device flexibility and require long lead times for design changes. The volume of these devices remains large and often includes thick or large frames or bezels around the device. The thick lightguides (typically 2 millimeters (mm) and larger) limit the design configurations, production methods, and illumination modes. The ability to further reduce the thickness and overall volume of these area light emitting devices has been limited by the ability to couple sufficient light flux into a thinner lightguide.

SUMMARY

In one aspect, a lightguide comprises a film including a body comprising a light emitting region and a light mixing region adjacent the light emitting region, a first bend formed in the film within the light mixing region having a first diameter in a first plane, wherein a first portion of the light mixing region is positioned behind the light emitting region, and a second bend formed in the film within the light mixing region, wherein a second portion of the light mixing region is positioned at a distance from the light emitting region less than the first diameter. In another embodiment, a lightguide comprises a film including a body having a first surface and an opposing second surface and a plurality of coupling lightguides extending from the body, each coupling lightguide of the plurality of coupling lightguides having an end, the plurality of coupling lightguides are folded and stacked such that the ends of the plurality of coupling lightguides define a light input surface; the body of the film comprises a light emitting region defined by a plurality of light extracting features and a light mixing region positioned between the plurality of coupling lightguides and the light emitting region, the light mixing region folded behind the light emitting region at a first bend with a first bend diameter in a first plane, wherein the first bend diameter is greater than an average separation between the first surface of the film within the light emitting region and the first surface of the film within the light mixing region positioned behind the light emitting region.

In one embodiment, a lightguide or light emitting device comprises a guide for one or more bends or folds. In this embodiment, the guide is an element with at least one curved surface adjacent a curved inner surface of the film at the bend. In one embodiment, the guide limits the radius of curvature of the bend or fold such that the film does not crease, tear, craze, or crack in the fold or bend region. In one embodiment, a lightguide comprises a film with a light mixing region disposed along the film between the light emitting region and an array of coupling lightguides extending from the film, the light mixing region is folded at a first fold such that a portion of the light mixing region is behind the light emitting region; and a first guide with a first curved surface adjacent an inner surface of the light mixing region of the film.

In another aspect, the ratio of a length of the light mixing region to a length of the light emitting region in the first plane is greater than 0.1. In a further aspect, the light mixing region comprises a second bend in a first plane between the first bend and the plurality of coupling lightguides, the second bend positioning a portion of the light mixing region at a distance from the light emitting region less than the first bend diameter.

In a further aspect, a lightguide comprises a film including a body comprising a light emitting region and a light mixing region adjacent the light emitting region; a first bend with a first diameter in a first plane formed in the film within the light mixing region, wherein a first portion of the light mixing region is positioned behind the light emitting region; and a second bend formed in the film within the light mixing region.

In one aspect, a light emitting device including a film-based lightguide with coupling lightguides extending therefrom includes a frame including one or more attachment mechanisms, wherein the lightguide is operatively coupled to the frame. In another aspect, the frame includes a plurality of attachment mechanisms on one or more sides or internal regions that facilitate the coupling of one or more components of the light emitting device to the frame. In one aspect, the attachment mechanism includes one or more tabs operatively coupled to one or more coupling lightguide relative position maintaining elements. In another aspect, the frame includes a support arm including one or more attachment mechanisms, wherein the support arm extends into the interior region or exterior region of the frame. In one aspect, the frame is thermally coupled to one or more light sources of the light emitting device and functions as a heat sink for the one or more light sources.

In one aspect, a film-based lightguide operatively coupled to the frame includes a first bend to fold a light mixing region of the lightguide behind the frame to position at least one of a light source, a light input coupler, and the relative position maintaining element behind the light emitting region of the lightguide. In this embodiment, the lightguide includes a second bend that positions at least one of the light source, the light input coupler, and the relative position maintaining element at a distance from the light emitting region of the lightguide in the thickness direction less than a diameter of the first bend. In another aspect, a large first bend in the lightguide (such as a first bend with a first bend angle greater than 180 degrees) positions at least one of the light source, the light input coupler, and the relative position maintaining element closer to the light emitting region and behind the light emitting region of the lightguide. In one aspect, the lightguide includes one or more bends or folds wherein each bend may bend the lightguide closer to another region of the lightguide and/or fold one region of the lightguide upon (or behind or above) another region of the lightguide. In one aspect, the lightguide includes two or more bends and the ratio of the length of the light mixing region to the length of the light emitting region of the lightguide is greater than one selected from the group: 0.1, 0.2, 0.4, 0.6, 0.8, 1, 1.2, 1.4, 1.6, 1.8, 2, 3, and 4. In one aspect, a method of manufacturing a light emitting device includes bending a film-based lightguide at a first bend with a first bend diameter such that a portion of the light mixing region is disposed behind the light emitting region of the lightguide and the distance between the light emitting region of the lightguide and the portion of the light mixing region behind the light emitting region is less than the first bend diameter.

DETAILED DESCRIPTION

Figure 1:
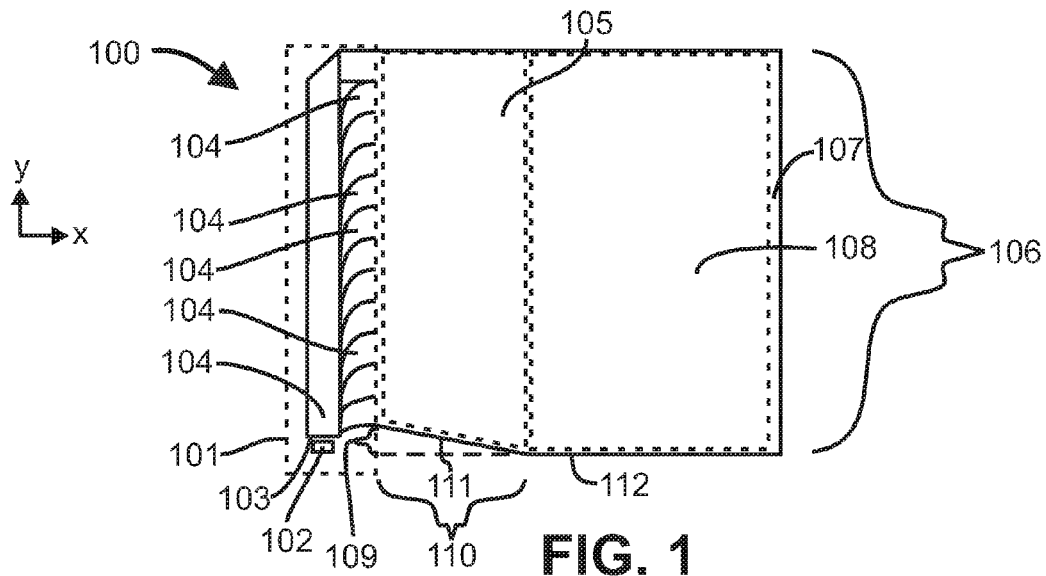
FIG. 1 is a top view of one embodiment of a light emitting device including a light input coupler disposed on one side of a lightguide.

The features and other details of several embodiments will now be more particularly described. It will be understood that particular embodiments described herein are shown by way of illustration and not as limitations. The principal features can be employed in various embodiments without departing from the scope of any particular embodiment. All parts and percentages are by weight unless otherwise specified.

Definitions

"Electroluminescent display" is defined herein as a means for displaying information wherein the legend, message, image or indicia thereon is formed by or made more apparent by an electrically excitable source of illumination. This includes illuminated cards, transparencies, pictures, printed graphics, fluorescent signs, neon signs, channel letter signs, light box signs, bus-stop signs, illuminated advertising signs, EL (electroluminescent) signs, LED signs, edge-lit signs, advertising displays, liquid crystal displays, electrophoretic displays, point of purchase displays, directional signs, illuminated pictures, and other information display signs. Electroluminescent displays can be self-luminous (emissive), back-illuminated (back-lit), front illuminated (front-lit), edge-illuminated (edge-lit), waveguide-illuminated or other configurations wherein light from a light source is directed through static or dynamic means for creating images or indicia.

"Optically coupled" as defined herein refers to coupling of two or more regions or layers such that the luminance of light passing from one region to the other is not substantially reduced by Fresnel interfacial reflection losses due to differences in refractive indices between the regions. "Optical coupling" methods include methods of coupling wherein the two regions coupled together have similar refractive indices or using an optical adhesive with a refractive index substantially near or between the refractive index of the regions or layers. Examples of "optical coupling" include, without limitation, lamination using an index-matched optical adhesive, coating a region or layer onto another region or layer, or hot lamination using applied pressure to join two or more layers or regions that have substantially close refractive indices. Thermal transferring is another method that can be used to optically couple two regions of material. Forming, altering, printing, or applying a material on the surface of another material are other examples of optically coupling two materials. "Optically coupled" also includes forming, adding, or removing regions, features, or materials of a first refractive index within a volume of a material of a second refractive index such that light propagates from the first material to the second material. For example, a white light scattering ink (such as titanium dioxide in a methacrylate, vinyl, or polyurethane based binder) may be optically coupled to a surface of a polycarbonate or silicone film by inkjet printing the ink onto the surface. Similarly, a light scattering material such as titanium dioxide in a solvent applied to a surface may allow the light scattering material to penetrate or adhere in close physical contact with the surface of a polycarbonate or silicone film such that it is optically coupled to the film surface or volume.

"Lightguide" or "waveguide" refers to a region bounded by the condition that light rays propagating at an angle that is larger than the critical angle will reflect and remain within the region. In a lightguide, the light will reflect or TIR (totally internally reflect) if the angle ($\alpha$) satisfies the condition $\alpha > \sin^{-1}(n_2/n_1)$, where $n_1$ is the refractive index of the medium inside the lightguide and $n_2$ is the refractive index of the medium outside the lightguide. Typically, $n_2$ is air with a refractive index of $n \approx 1$; however, high and low refractive index materials can be used to achieve lightguide regions. A lightguide does not need to be optically coupled to all of its components to be considered as a lightguide. Light may enter from any face (or interfacial refractive index boundary) of the waveguide region and may totally internally reflect from the same or another refractive index interfacial boundary. A region can be functional as a waveguide or lightguide for purposes illustrated herein as long as the thickness is larger than the wavelength of light of interest. For example, a lightguide may be a 5 micron region or layer of a film or it may be a 3 millimeter sheet including a light transmitting polymer.

"In contact" and "disposed on" are used generally to describe that two items are adjacent one another such that the whole item can function as desired. This may mean that additional materials can be present between the adjacent items, as long as the item can function as desired.

"Adjacent" is generally used to refer to an element that is located next or in contact with the adjacent element without an object therebetween. In the context of this application, adjacent may include an air gap between two adjacent elements or the elements may be contacting each other.

A "film" as used herein refers to a thin extended region, membrane, or layer of material.

A "bend" as used herein refers to a deformation or transformation in shape by the movement of a first region of an element relative to a second region, for example. Examples of bends include the bending of a clothes rod when heavy clothes are hung on the rod or rolling up a paper document to fit it into a cylindrical mailing tube. A "fold" as used herein is a type of bend and refers to the bend or lay of one region of an element toward a second region such that the first region covers at least a portion of the second region. An example of a fold includes bending a letter and forming creases to place it in an envelope. A fold does not require that all regions of the element overlap. A bend or fold may be a change in the direction along a first direction along a surface of the object. A fold or bend may or may not have creases and the bend or fold may occur in one or more directions or planes such as 90 degrees or 45 degrees. A bend or fold may be lateral, vertical, torsional, or a combination thereof.

Light Emitting Device

In one embodiment, a light emitting device includes a first light source, a light input coupler, a light mixing region, and a lightguide including a light emitting region with a light extraction feature. In one embodiment, the first light source has a first light source emitting surface, the light input coupler includes an input surface disposed to receive light from the first light source and transmit the light through the light input coupler by total internal reflection through a plurality of coupling lightguides. In this embodiment, light exiting the coupling lightguides is re-combined and mixed in a light mixing region and directed through total internal reflection within a lightguide or lightguide region. Within the lightguide, a portion of incident light is directed within the light extracting region by light extracting features into a condition whereupon the angle of light is less than the critical angle for the lightguide and the directed light exits the lightguide through the lightguide light emitting surface.

In a further embodiment, the lightguide is a film with light extracting features below a light emitting device output surface within the film. The film is separated into coupling lightguide strips which are folded such that the coupling lightguide strips form a light input coupler with a first input surface formed by the collection of edges of the coupling lightguide strips.

In one embodiment, the light emitting device has an optical axis defined herein as the direction of peak luminous intensity for light emitting from the light emitting surface or region of the device for devices with output profiles with one peak. For optical output profiles with more than one peak and the output is symmetrical about an axis, such as with a "batwing" type profile, the optical axis of the light emitting device is the axis of symmetry of the light output. In light emitting devices with angular luminous intensity optical output profiles with more than one peak which are asymmetrical about an axis, the light emitting device optical axis is the angular weighted average of the luminous intensity output. For non-planar output surfaces, the light emitting device optical axis is evaluated in two orthogonal output planes and may be a constant direction in a first output plane and at a varying angle in a second output plane orthogonal to the first output plane. For example, light emitting from a cylindrical light emitting surface may have a peak angular luminous intensity (thus light emitting device optical axis) in a light output plane that does not include the curved output surface profile and the angle of luminous intensity could be substantially constant about a rotational axis around the cylindrical surface in an output plane including the curved surface profile. Thus, in this example, the peak angular intensity is a range of angles. When the light emitting device has a light emitting device optical axis in a range of angles, the optical axis of the light emitting device includes the range of angles or an angle chosen within the range. The optical axis of a lens or element is the direction of which there is some degree of rotational symmetry in at least one plane and as used herein corresponds to the mechanical axis. The optical axis of the region, surface, area, or collection of lenses or elements may differ from the optical axis of the lens or element, and as used herein is dependent on the incident light angular and spatial profile, such as in the case of off-axis illumination of a lens or element.

Various light emitting devices, components or layers of light emitting devices, displays, electroluminescent displays, their methods of manufacture, and their configurations can be used with embodiments disclosed herein and include those disclosed in U.S. patent application Ser. No. 13/088,167, the contents of which are incorporated by reference herein.

Light Input Coupler

In one embodiment, a light input coupler includes a plurality of coupling lightguides disposed to receive light emitting from a light source and channel the light into a lightguide. In one embodiment, the plurality of coupling lightguides are strips cut from a lightguide film such that each coupling lightguide strip remains un-cut on at least one edge but can be rotated or positioned (or translated) substantially independently from the lightguide to couple light through at least one edge or surface of the strip. In another embodiment, the plurality of coupling lightguides are not cut from the lightguide film and are separately optically coupled to the light source and the lightguide. In another embodiment, the light emitting device includes a light input coupler having a core region of a core material and a cladding region or cladding layer of a cladding material on at least one face or edge of the core material with a refractive index less than a refractive index of the core material. In other embodiment, the light input coupler includes a plurality of coupling lightguides wherein a portion of light from a light source incident on a face of at least one strip is directed into the lightguide such that light travels in a waveguide condition. The light input coupler may also include one or more of the following: a strip folding device, a strip holding element, and an input surface optical element.

In one embodiment, a first array of light input couplers is positioned to input light into the light mixing region, light emitting region, or lightguide region and a separation distance between the light input couplers varies. In one embodiment, a light emitting device includes at least three light input couplers disposed along a side of a film having a separation distance between a first pair of input couplers along the side of the film different than a separation distance between a second pair of input couplers along the side of the film. For example, in one embodiment a separation distance between the first pair of input couplers along the side of the film is great than a separation distance between a second pair of input couplers along the side of the film.

Light Source

In one embodiment, a light emitting device includes at least one light source selected from a group: fluorescent lamp, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radiofluorescent lamp, halogen lamp, incandescent lamp, mercury vapor lamp, sodium vapor lamp, high pressure sodium lamp, metal halide lamp, tungsten lamp, carbon arc lamp, electroluminescent lamp, laser, photonic bandgap based light source, quantum dot based light source, high efficiency plasma light source, microplasma lamp. The light emitting device may include a plurality of light sources arranged in an array, on opposite sides of lightguide, on orthogonal sides of a lightguide, on 3 or more sides of a lightguide, or on 4 sides of a substantially planer lightguide. The array of light sources may be a linear array with discrete LED packages includes at least one LED die. In another embodiment, a light emitting device includes a plurality of light sources within one package disposed to emit light toward a light input surface. In one embodiment, the light emitting device includes 1, 2, 3, 4, 5, 6, 8, 9, 10, or more than 10 light sources. In another embodiment, the light emitting device includes an organic light emitting diode disposed to emit light as a light emitting film or sheet. In another embodiment, the light emitting device includes an organic light emitting diode disposed to emit light into a lightguide.

LED Array

In one embodiment, the light emitting device includes a plurality of LEDs or LED packages wherein the plurality of LEDs or LED packages includes an array of LEDs. The array components (LEDs or electrical components) may be physically (and/or electrically) coupled to a single circuit board or they may be coupled to a plurality of circuit boards that may or may not be directly physically coupled (i.e. such as not on the same circuit board). In one embodiment, the array of LEDs is an array including at least two selected from the group: red, green, blue, and white LEDs. In this embodiment, the variation in the white point due to manufacturing or component variations can be reduced. In another embodiment, the LED array includes at least one cool white LED and one red LED. In this embodiment, the CRI, or Color Rendering Index, is higher than the cool white LED illumination alone.

LED Array Location

In one embodiment, a plurality of LED arrays are disposed to couple light into a single light input coupler or more than one light input coupler. In a further embodiment, a plurality of LEDs disposed on a circuit board are disposed to couple light into a plurality of light input couplers that direct light toward a plurality of sides of a light emitting device including a light emitting region. In a further embodiment, a light emitting device includes an LED array and light input coupler folded behind the light emitting region of the light emitting device such that the LED array and light input coupler are not visible when viewing the center of the light emitting region at an angle perpendicular to the surface. In another embodiment, a light emitting device includes a single LED array disposed to couple light into at least one light input coupler disposed to direct light into the light emitting region from the bottom region of a light emitting device. In one embodiment, a light emitting device includes a first LED array and a second LED array disposed to couple light into a first light input coupler and a second light input coupler, respectively, wherein the first light input coupler and second light input coupler are disposed to direct light into the light emitting region from the top region and bottom region, respectively, of a light emitting device. In a further embodiment, a light emitting device includes a first LED array, a second LED array, and a third LED array, disposed to couple light into a first light input coupler, a second light input coupler, and a third light input coupler, respectively, disposed to direct light into the light emitting region from the bottom region, left region, and right region, respectively, of a light emitting device. In another embodiment, a light emitting device includes a first LED array, a second LED array, a third LED array, and a fourth LED array, disposed to couple light into a first light input coupler, a second light input coupler, a third light input coupler, and a fourth light input coupler, respectively, disposed to direct light into the light emitting region from the bottom region, left region, right region, and top region, respectively, of a light emitting device.

Wavelength Conversion Material

In another embodiment, the LED is a blue or ultraviolet LED combined with a phosphor. In another embodiment, a light emitting device includes a light source with a first activating energy and a wavelength conversion material which converts a first portion of the first activating energy into a second wavelength different than the first. In another embodiment, the light emitting device includes at least one wavelength conversion material selected from the group: a fluorophore, phosphor, a fluorescent dye, an inorganic phosphor, photonic bandgap material, a quantum dot material, a fluorescent protein, a fusion protein, a fluorophores attached to protein to specific functional groups (such as amino groups (active ester, carboxylate, isothiocyanate, hydrazine), carboxyl groups (carbodiimide), thiol (maleimide, acetyl bromide), azide (via click chemistry or non-specifically (glutaraldehyde))), quantum dot fluorophores, small molecule fluorophores, aromatic fluorophores, conjugated fluorophores, a fluorescent dye, and other wavelength conversion material.

In one embodiment, the light source includes a semiconductor light emitter such as an LED and a wavelength conversion material that converts a portion of the light from the emitter to a shorter or longer wavelength. In another embodiment, at least one selected from the group: light input coupler, cladding region, coupling lightguide, input surface optic, coupling optic, light mixing region, lightguide, light extraction feature or region, and light emitting surface includes a wavelength conversion material.

Light Input Coupler Input Surface

In one embodiment, the light input coupler includes a collection of coupling lightguides with a plurality of edges forming a light coupler input surface. In another embodiment, an optical element is disposed between the light source and at least one coupling lightguide wherein the optical element receives light from the light source through a light coupler input surface. In some embodiments, the input surface is substantially polished, flat, or optically smooth such that light does not scatter forwards or backwards from pits, protrusions or other rough surface features. In some embodiments, an optical element is disposed to between the light source and at least one coupling lightguide to provide light redirection as an input surface (when optically coupled to at least one coupling lightguide) or as an optical element separate or optically coupled to at least one coupling lightguide such that more light is redirected into the lightguide at angles greater than the critical angle within the lightguide than would be the case without the optical element or with a flat input surface. The coupling lightguides may be grouped together such that the edges opposite the lightguide region are brought together to form an input surface including their thin edges.

Stacked Strips or Segments of Film Forming a Light Input Coupler

In one embodiment, the light input coupler is region of a film that includes the lightguide and the light input coupler which includes strip sections of the film which form coupling lightguides that are grouped together to form a light coupler input surface. The coupling lightguides may be grouped together such the edges opposite the lightguide region are brought together to form an input surface including their thin edges. A planar input surface for a light input coupler can provide beneficial refraction to redirect a portion of the input light from the surface into angles such that it propagates at angles greater than the critical angle for the lightguide. In another embodiment, a substantially planar light transmitting element is optically coupled to the grouped edges of coupling lightguides. One or more of the edges of the coupling lightguides may be polished, melted, smoothed using a caustic or solvent material, adhered with an optical adhesive, solvent welded, or otherwise optically coupled along a region of the edge surface such that the surface is substantially polished, smooth, flat, or substantially planarized.

Light Redirecting Optical Element

In one embodiment, a light redirecting optical element is disposed to receive light from at least one light source and redirect the light into a plurality of coupling lightguides. In another embodiment, the light redirecting optical element is at least one selected from the group: secondary optic, mirrored element or surface, reflective film such as aluminized PET, giant birefringent optical films such as Vikuiti™ Enhanced Specular Reflector Film by 3M Inc., curved mirror, totally internally reflecting element, beamsplitter, and dichroic reflecting mirror or film.

Light Collimating Optical Element

In one embodiment, the light input coupler includes a light collimating optical element. A light collimating optical element receives light from the light source with a first angular full-width at half maximum intensity within at least one input plane and redirects a portion of the incident light from the light source such that the angular full-width at half maximum intensity of the light is reduced in the first input plane. In one embodiment, the light collimating optical element is one or more of the following: a light source primary optic, a light source secondary optic, a light input surface, and an optical element disposed between the light source and at least one coupling lightguide. In another embodiment, the light collimating element is one or more of the following: an injection molded optical lens, a thermoformed optical lens, and a cross-linked lens made from a mold. In another embodiment, the light collimating element reduces the angular full-width at half maximum (FWHM) intensity within the input plane and a plane orthogonal to the input plane.

In one embodiment, a light emitting device includes a light input coupler and a film-based lightguide. In one embodiment the light input coupler includes a light source and a light collimating optical element disposed to receive light from one or more light sources and provide light output in a first output plane, second output plane orthogonal to the first plane, or in both output planes with an angular full-width at half maximum intensity in air less than one selected from the group: 60 degrees, 40 degrees, 30 degrees, 20 degrees, and 10 degrees from the optical axis of the light exiting the light collimating optical element.

Coupling Light Guides

In one embodiment, the coupling lightguide is a region wherein light within the region can travel in a waveguide condition and a portion of the light input into a surface or region of the coupling lightguides passes through the coupling lightguide toward a lightguide or light mixing region. The coupling lightguide, in some embodiments, may serve to geometrically transform a portion of the flux from a light source from a first shaped area to a second shaped area different from the first shaped area. In an example of this embodiment, the light input surface of the light input coupler formed from the edges of folded strips (coupling lightguides) of a planar film has dimensions of a rectangle that is 3 millimeters by 2.7 millimeters and the light input coupler couples light into a planar section of a film in the light mixing region with a cross-sectional dimensions of 40.5 millimeters by 0.2 millimeters.

Coupling Lightguide Folds and Bends

In one embodiment, a light emitting device includes a light mixing region disposed between a lightguide and strips or segments cut to form coupling lightguides, whereby a collection of edges of the strips or segments are brought together to form a light input surface of the light input coupler disposed to receive light from a light source. In one embodiment, the light input coupler includes a coupling lightguide wherein the coupling lightguide includes at least one fold or bend in a plane such that at least one edge overlaps another edge. In another embodiment, the coupling lightguide includes a plurality of folds or bends wherein edges of the coupling lightguide can be abutted together in region such that the region forms a light input surface of the light input coupler of the light emitting device. In one embodiment, at least one coupling lightguide includes a strip or a segment that is bent or folded to radius of curvature of less than 75 times a thickness of the strip or the segment. In another embodiment, at least one coupling lightguide includes a strip or a segment that is bended or folded to radius of curvature greater than 10 times a thickness of the strip or the segment. In another embodiment, at least one coupling lightguide is bent or folded such that a longest dimension in a cross-section through the light emitting device or coupling lightguide in at least one plane is less than without the fold or bend. Segments or strips may be bent or folded in more than one direction or region and the directions of folding or bending may be different between strips or segments.

Coupling Lightguide Lateral Edges

In one embodiment, the lateral edges, defined herein as the edges of the coupling lightguide which do not substantially receive light directly from the light source and are not part of the edges of the lightguide region. The lateral edges of the coupling lightguide receive light substantially only from light propagating within the coupling lightguide. In one embodiment, the lateral edges are at least one selected from the group: uncoated, coated with a reflecting material, disposed adjacent to a reflecting material, and cut with a specific cross-sectional profile. The lateral edges may be coated, bonded to or disposed adjacent to a specularly reflecting material, partially diffusely reflecting material, or diffuse reflecting material. In one embodiment, the edges are coated with a specularly reflecting ink including nano-sized or micron-sized particles or flakes which substantially reflect the light in a specular manner when the coupling lightguides are brought together from folding or bending.

Width of the Coupling Lightguides

In one embodiment, the dimensions of the coupling lightguides are substantially equal in width and thickness to each other such that the input surface areas for each edge surface are substantially the same. In another embodiment, at least one selected from the group: coupling lightguide width, the largest width of a coupling waveguide, the average width of the coupling lightguides, and the width of each coupling lightguides is selected from a group of: 0.5 mm-1 mm, 1 mm-2 mm, 2 mm-3 mm, 3 mm-4 mm, 5 mm-6 mm, 0.5 mm-2 mm, 0.5 mm-25 mm, 0.5 mm-10 mm, 10-37 mm, and 0.5 mm-5 mm. In one embodiment, at least one selected from the group: the coupling lightguide width, the largest width of a coupling waveguide, the average width of the coupling lightguides, and the width of each coupling lightguides is less than 20 millimeters.

Separation Between the Lightguide Region Edge and the Coupling Light Guide Nearest the Edge In one embodiment, a coupling lightguide nearest the edge of the film-based lightguide is spaced from the edge of the film adjacent the side. For example, in one embodiment, the first coupling lightguide along a side of a film-based lightguide is separated from the edge of the lightguide region by a distance greater than 1 mm. In another embodiment, the first coupling lightguide along a side of a film-based lightguide is separated from the edge of the lightguide region by a distance greater than one selected from the group: 0.5, 1, 2, 4, 6, 8, 10, 20, and 50 millimeters. In one embodiment, the distance between the lightguide region edge and the first coupling lightguide along a side improves the uniformity in the lightguide region due to the light from the first coupling lightguide reflecting from the lateral edge of the lightguide region.

Shaped or Tapered Coupling Lightguides

The width of the coupling lightguides may vary in a predetermined pattern. In one embodiment, the width of the coupling lightguides varies from a large width in a central coupling lightguide to smaller width in lightguides further from the central coupling lightguide as viewed when the light input edges of the coupling lightguides are disposed together to form a light input surface on the light input coupler. In this embodiment, a light source with a substantially circular light output aperture can couple into the coupling lightguides such that the light at higher angles from the optical axis are coupled into a smaller width strip such that the uniformity of the light emitting surface along the edge of the lightguide or lightguide region and parallel to the input edge of the lightguide region disposed to receive the light from the coupling lightguides is greater than one selected from the group: 60%, 70%, 80%, 90% and 95%.

Other shapes of stacked coupling lightguides can be envisioned, such as triangular, square, rectangular, oval, etc. that provide matched input areas to the light emitting surface of the light source. The widths of the coupling lightguides may also be tapered such that they redirect a portion of light received from the light source. The lightguides may be tapered near the light source, in the area along the coupling lightguide between the light source and the lightguide region, near the lightguide region, or some combination thereof.

The shape of a coupling lightguide is referenced herein from the lightguide region or light emitting region or body of the lightguide. One or more coupling lightguides extending from a side or region of the lightguide region may expand (widen or increase in width) or taper (narrow or decrease in width) in the direction toward the light source. In one embodiment, coupling lightguides taper in one or more regions to provide redirection or partial collimation of the light traveling within the coupling lightguides from the light source toward the lightguide region. In one embodiment, one or more coupling lightguides widens along one lateral edge and tapers along the opposite lateral edge. In this embodiment, the net effect may be that the width remains constant. The widening or tapering may have different profiles or shapes along each lateral side for one or more coupling lightguides. The widening, tapering, and the profile for each lateral edge of each coupling lightguide may be different and may be different in different regions of the coupling lightguide. For example, one coupling lightguide in an array of coupling lightguides may have a parabolic tapering profile on both sides of the coupling lightguides in the region near the light source to provide partial collimation, and at the region starting at about 50% of the length of the coupling lightguides one lateral edge tapers in a linear angle and the opposite side includes a parabolic shaped edge. The tapering, widening, shape of the profile, location of the profile, and number of profiles along each lateral edge may be used to provide control over one or more selected from the group: spatial or angular color uniformity of the light exiting the coupling lightguides into the light mixing region (or light emitting region), spatial or angular luminance uniformity of the light exiting the coupling lightguides into the light mixing region (or light emitting region), angular redirection of light into the light mixing region (or light emitting region) of the lightguide (which can affect the angular light output profile of the light exiting the light emitting region along with the shape, size, and type of light extraction features), relative flux distribution within the light emitting region, and other light redirecting benefits such as, without limitation, redirecting more light toward a second, extending light emitting region.

Interior Light Directing Edge

In one embodiment, the interior region of one or more coupling lightguides includes an interior light directing edge. The interior light directing edge may be formed by cutting or otherwise removing an interior region of the coupling lightguide. In one embodiment, the interior light directed edge redirects a first portion of light within the coupling lightguide. In one embodiment, the interior light directing edges provide an additional level of control for directing the light within the coupling lightguides and can provide light flux redistribution within the coupling lightguide and within the lightguide region to achieve a predetermined light output pattern (such as higher uniformity or higher flux output) in a specific region.

In one embodiment, at least one interior light directing edge is positioned within a coupling lightguide to receive light propagating within the coupling lightguide within a first angular range from the optical axis of light traveling within the coupling lightguide and direct the light to a second, different angular range propagating within the coupling lightguide. In one embodiment, the first angular range is selected from the group: 70-89, 70-80, 60-80, 50-80, 40-80, 30-80, 20-80, 30-70, and 30-60 degrees; and the second angular range is selected from the group: 0-10, 0-20, 0-30, 0-40, 0-50, 10-40, and 20-60 degrees. In one embodiment, a plurality of interior light directing edges are formed after the coupling lightguides are stacked. In another embodiment, one or more coupling lightguides have interior light directing edges that form a channel that spatially separates light traveling within the coupling lightguide. In one embodiment, a length along the optical axis of light travelling within the coupling lightguide of one or more interior light directing edges is greater than one selected from the group: 20%, 30%, 40%, 50%, 60%, 70%, 80%, and 90% of a length from an input surface of the coupling lightguide to the lightguide region or the light mixing region along the optical axis of light traveling within the coupling lightguide. In another embodiment, one or more coupling lightguides have interior light directing edges positioned within one selected from the group: 1, 5, 7, 10, 15, 20, 25 millimeters from the lightguide region of the film-based lightguide. In one embodiment, one or more coupling lightguides have interior light directing edges positioned within one selected from the group: 1, 5, 7, 10, 15, 20, 25 millimeters from the light input surface of the one or more coupling lightguides. In a further embodiment, one or more coupling lightguides have at least one interior light directing edge with a width of the interior light directing edge in a direction parallel to the fold line greater than one selected from the group of: 5, 10, 15, 20, 25, 30, 35, 40, 45, 50, and 60 percent of a width of the coupling lightguide at the lightguide region. In a further embodiment, at least one coupling lightguide has two adjacent interior light directing edges wherein the average separation between the interior light directing edges in a direction parallel to a fold line is greater than one selected from the group of: 5, 10, 15, 20, 25, 30, 35, 40, 45, 50, and 60 percent of the width of the coupling lightguide at the lightguide region.

In another embodiment, at least one coupling lightguide includes a plurality of channels defined by at least one interior light directing edge and a lateral edge of the coupling lightguide. In a further embodiment, the coupling lightguide includes a channel defined by a first interior light directing edge and a second interior light directing edge. In one embodiment, one or more channels defined by interior light directing edges and/or lateral edges of the coupling lightguide separate angular ranges of light from the light source into spatially separated channels that can transfer the spatial separation to the lightguide region. In one embodiment, the channels are parallel to the extended direction of an array of coupling lightguides. In another embodiment, the light source includes a plurality of light emitting diodes formed in an array such that the optical axis of a first light source enters a first channel defined in a coupling lightguide and the optical axis of a second source enters a second channel defined in a coupling lightguide. In one embodiment, one or more interior light directing edges extend from within one or more coupling lightguides into the lightguide region of the lightguide. In another embodiment, the lightguide region has one or more interior light directing edges. In a further embodiment, the lightguide region has one or more interior light directing edges and one or more coupling lightguides include one or more interior light directing edges. In another embodiment, one or more interior light directing edges extend from within one or more coupling lightguides into the light emitting region of the lightguide. In this embodiment, for example, a light source including red, green, and blue light emitting diodes in a linear array adjacent a first, second, and third channel of a plurality of coupling lightguides, respectively can be directed to an alternating first, second, and third pixel region within the light emitting region to create a spatial arrangement of repeating red, green, blue, red, green, blue, red, green, blue color pixels in a light emitting region for a color display or sign. In another embodiment, the interior region of the light mixing region or lightguide region includes at least one interior light directing edge.

Coupling Lightguide Orientation Angle

In a further embodiment, at least one portion of the array of coupling lightguides is disposed at a first coupling lightguide orientation angle to the edge of at least one of the light mixing region and light emitting region which it directs light into. The coupling lightguide orientation angle is defined as the angle between the coupling lightguide axis and the direction parallel to the major component of the direction of the coupling lightguides to the light emitting region of the lightguide. The major component of the direction of the coupling lightguide to the light emitting region of the lightguide is orthogonal to the array direction of the array of coupling lightguides at the light mixing region (or lightguide region if they extend directly from the light emitting region). In one embodiment, the orientation angle of a coupling lightguide or the average orientation angle of a plurality of coupling lightguides is at least one selected from the group: 1-10 degrees, 10-20 degrees, 20-30 degrees, 30-40 degrees, 40-50 degrees, 60-70 degrees, 70-80 degrees, 1-80 degrees, 10-70 degrees, 20-60 degrees, 30-50 degrees, greater than 5 degrees, greater than 10 degrees, and greater than 20 degrees.

Non-Folded Coupling Lightguide

In a further embodiment, the film-based lightguide includes a non-folded coupling lightguide disposed to receive light from the light input surface and direct light toward the lightguide region without turning the light. In one embodiment, the non-folded lightguide is used in conjunction with one or more light turning optical elements, light coupling optical elements, coupling lightguides with light turning edges, or coupling lightguides with collimating edges. For example, a light turning optical element may be disposed above or below a non-folded coupling lightguide such that a first portion of light from a light source substantially maintains the direction of its optical axis while passing through the non-folded coupling lightguide and the light from the source received by the light turning optical element is turned to enter into a stacked array of coupling lightguides. In another embodiment, the stacked array of coupling lightguides includes folded coupling lightguides and a non-folded coupling lightguide.

In another embodiment, the non-folded coupling lightguide is disposed near an edge of the lightguide. In one embodiment, the non-folded coupling lightguide is disposed in the middle region of the edge of the lightguide region. In a further embodiment, the non-folded coupling lightguide is disposed along a side of the lightguide region at a region between the lateral sides of the lightguide region. In one embodiment, the non-folded coupling lightguide is disposed at various regions along one edge of a lightguide region wherein a plurality of light input couplers are used to direct light into the side of a lightguide region.

In another embodiment, the folded coupling lightguides have light collimating edges, substantially linear edges, or light turning edges. In one embodiment, at least one selected from the group: array of folded coupling lightguides, light turning optical element, light collimating optical element, and light source are physically coupled to the non-folded coupling lightguide. In another embodiment, folded coupling lightguides are physically coupled to each other and to the non-folded coupling lightguide by a pressure sensitive adhesive cladding layer and the thickness of the unconstrained lightguide film including the light emitting region and the array of coupling lightguides is less than one of the following: 1.2 times, 1.5 times, 2 times, and 3 times the thickness of the array of coupling lightguides. By bonding the folded coupling lightguides only to themselves, the coupling lightguides (when un-constrained) typically bend upward and increase the thickness of the array due to the folded coupling lightguides not being physically coupled to a fixed or relatively constrained region. By physically coupling the folded coupling lightguides to a non-folded coupling lightguide, the array of coupling lightguides is physically coupled to a separate region of the film which increases the stability and thus reduces the ability of the elastic energy stored from the bend to be released.

Coupling Lightguide Stack

In one embodiment, coupling lightguides extending from a lightguide region in a film-based lightguide are folded at a 90 degree fold angle with their ends stacked. In this embodiment, the radius of curvature for each of the coupling lightguides is different due to the thickness of each of the coupling lightguides. In this embodiment, the radius of curvature for the nth coupling lightguide is determined by the equation:

$$R_n = R_1 + \frac{(n-1)}{2}t,$$

where $R_1$ is an initial (smallest radius) coupling lightguide radius, and t is a thickness of the coupling lightguides.

The coupling lightguide stack can be configured in numerous ways to compensate for the different radii of curvature. In one embodiment, the coupling lightguides have one or more compensation features selected from the group: staggered light input surfaces; coupling lightguides oriented at an angle with respect to each other; varying lateral fold locations; coupling lightguides angled in an oriented stack; non-uniform tension or torsion; a constant fold radius of curvature stack; and other compensation techniques or features.

Light Mixing Region

In one embodiment, a light emitting device includes a light mixing region disposed in an optical path between the light input coupler and the lightguide region. The light mixing region can provide a region for the light output from individual coupling lightguides to mix together and improve at least one of a spatial luminance uniformity, a spatial color uniformity, an angular color uniformity, an angular luminance uniformity, an angular luminous intensity uniformity or any combination thereof within a region of the lightguide or of the surface or output of the light emitting region or light emitting device. In one embodiment, a width of the light mixing region is selected from a range from 0.1 mm (for small displays) to more than 10 feet (for large billboards). In one embodiment, the light mixing region is the region disposed along an optical path near the end region of the coupling lightguides wherein light from two or more coupling lightguides may inter-mix and subsequently travel to a light emitting region of the lightguide. In one embodiment, the light mixing region is formed from the same component or material as at least one of the lightguide, lightguide region, light input coupler, and coupling lightguides.

Width of the Light Mixing Region or Array of Coupling Lightguides

In one embodiment, the length of the array of coupling lightguides and/or the light mixing region is longer than the light emitting region or lightguide region in a direction parallel to the array direction of the coupling lightguides (perpendicular to the extended direction of the array of coupling lightguides). In one embodiment, the array of coupling lightguides and/or the light mixing region extends past a lateral side of the light emitting region in the direction parallel to the array direction of the coupling lightguides (the perpendicular to the extended direction of the coupling lightguides) by a distance selected from the group: greater than 1 millimeter; greater than 2 millimeters; greater than 4 millimeters; greater than 6 millimeters; greater than 10 millimeters; greater than 15 millimeters; greater than 20 millimeters; greater than 50% of the average width of the coupling lightguides; greater than 100% of the average width of the coupling lightguides; and greater than 1%, 2%, 5%, or 10% of the length of the light emitting region in the direction parallel to the array direction of the coupling lightguides. In one embodiment, the array of coupling lightguides or light mixing region extends past the lateral edge of the light emitting region opposite the direction of the fold. In a further embodiment, the array of coupling lightguides or light mixing region extends past the lateral side of the light emitting region in the direction of the fold. In one embodiment, more light can be introduced into the edge region (defined as the region of the light emitting area within 10% of the lateral edge) by extending the array of coupling lightguides past the lateral edge of the light emitting region and/or extending the light mixing region past the lateral edge of the light emitting region. In a further embodiment, a lateral edge of the light mixing region, a lateral edge of one or more coupling lightguides, or an internal light directing edge is oriented at a first extended orientation angle to the extended direction of the coupling lightguides to direct light from the extended region of the array of coupling lightguides or the light mixing region toward the light emitting region of the film-based lightguide. In one embodiment, the first extended orientation angle is greater than one selected from the group: 0, 2, 5, 10, 20, 30, 45, and 60 degrees. For example, in one embodiment, the array of coupling lightguides includes a coupling lightguide that extends past the far lateral edge (the edge furthest from the light source) of the light emitting area and the light mixing region includes a lateral edge with an extended orientation angle of 30 degrees. In this embodiment, the far coupling lightguides are longer in length, and thus more light is absorbed through the material. One method of compensation for the light flux difference reaching the far edge region of the light emitting area due to the longer path length of light traveling toward the far edge region of the light emitting area is to add an additional coupling lightguide that can receive a distributed portion of the light from the light source and direct it into the far edge region of the light emitting area by an angled lateral edge in the extended coupling lightguide, the light mixing region, or an internal light directing edge.

Housing or Holding Device for Light Input Coupler

In one embodiment, a light emitting device includes a housing or holding device that holds or includes at least part of a light input coupler and light source. The housing or holding device may house or contain within at least one selected from the group: light input coupler, light source, coupling lightguides, lightguide, optical components, electrical components, heat sink or other thermal components, attachment mechanisms, registration mechanisms, folding mechanisms devices, and frames. The housing or holding device may include a plurality of components or any combination of the aforementioned components. The housing or holding device may serve one or more of functions selected from the group: protect from dust and debris contamination, provide air-tight seal, provide a water-tight seal, house or contain components, provide a safety housing for electrical or optical components, assist with the folding or bending of the coupling lightguides, assist in the alignment or holding of the lightguide, coupling lightguide, light source or light input coupler relative to another component, maintain the arrangement of the coupling lightguides, recycle light (such as with reflecting inner walls), provide attachment mechanisms for attaching the light emitting device to an external object or surface, provide an opaque container such that stray light does not escape through specific regions, provide a translucent surface for displaying indicia or providing illumination to an object external to the light emitting device, include a connector for release and interchangeability of components, and provide a latch or connector to connect with other holding devices or housings.

In one embodiment, the housing or holding device includes at least one selected from the group: connector, pin, clip, latch, adhesive region, clamp, joining mechanism, and other connecting element or mechanical means to connect or hold the housing or holding device to another housing or holding device, lightguide, coupling lightguide, film, strip, cartridge, removable component or components, an exterior surface such as a window or automobile, light source, electronics or electrical component, circuit board for the electronics or light source such as an LED, heat sink or other thermal control element, frame of the light emitting device, and other component of the light emitting device.

In a another embodiment, the input ends and output ends of the coupling lightguides are held in physical contact with the relative position maintaining elements by at least one selected from the group: magnetic grips, mechanical grips, clamps, screws, mechanical adhesion, chemical adhesion, dispersive adhesion, diffusive adhesion, electrostatic adhesion, vacuum holding, or an adhesive.

Curved or Flexible Housing

In another embodiment, the housing includes at least one curved surface. A curved surface can permit non-linear shapes or devices or facilitate incorporating non-planer or bent lightguides or coupling lightguides. In one embodiment, a light emitting device includes a housing with at least one curved surface wherein the housing includes curved or bent coupling lightguides. In another embodiment, the housing is flexible such that it may be bent temporarily, permanently or semi-permanently. By using a flexible housing, for example, the light emitting device may be able to be bent such that the light emitting surface is curved along with the housing, the light emitting area may curve around a bend in a wall or corner, for example. In one embodiment, the housing or lightguide may be bent temporarily such that the initial shape is substantially restored (bending a long housing to get it through a door for example). In another embodiment, the housing or lightguide may be bent permanently or semi-permanently such that the bent shape is substantially sustained after release (such as when it is desired to have a curved light emitting device to provide a curved sign or display, for example).

Housing Including a Thermal Transfer Element

In one embodiment, the housing includes a thermal transfer element disposed to transfer heat from a component within the housing to an outer surface of the housing. In another embodiment, the thermal transfer element is one selected from the group: heat sink, metallic or ceramic element, fan, heat pipe, synthetic jet, air jet producing actuator, active cooling element, passive cooling element, rear portion of a metal core or other conductive circuit board, thermally conductive adhesive, or other component known to thermally conduct heat. In one embodiment, the thermal transfer element has a thermal conductivity (W/(m·K)) greater than one selected from the group: 0.2, 0.5, 0.7, 1, 3, 5, 50, 100, 120, 180, 237, 300, and 400. In another embodiment, a frame supporting the film-based lightguide (such as one that holds tension in the film to maintain flatness) is a thermal transfer element. In one embodiment, the light source is an LED and the LED is thermally coupled to the ballast or frame that is a thermal transfer element. In a further embodiment, a frame or ballast used to thermally transfer heat away from the light source and is also a housing for the light emitting device.

Low Contact Area Cover

In one embodiment, a low contact area cover is disposed between at least one coupling lightguide and the exterior to the light emitting device. The low contact area cover or wrap provides a low surface area of contact with a region of the lightguide or a coupling lightguide and may further provide at least one selected from the group: protection from fingerprints, protection from dust or air contaminants, protection from moisture, protection from internal or external objects that would decouple or absorb more light than the low contact area cover when in contact in one or more regions with one or more coupling lightguides, provide a means for holding or including at least one coupling lightguide, hold the relative position of one or more coupling lightguides, reflect light back through the lightguide, and prevent the coupling lightguides from unfolding into a larger volume or contact with a surface that could de-couple or absorb light. In one embodiment, the low contact area cover is disposed substantially around one or more coupling lightguide stacks or arrays and provides one or more of the functions selected from the group: reducing the dust buildup on the coupling lightguides, protecting one or more coupling lightguides from frustrated total internal reflection or absorption by contact with another light transmitting or absorbing material, and preventing or limiting scratches, cuts, dents, or deformities from physical contact with other components or assemblers and/or users of the device.

Cladding Layer

In one embodiment, at least one of the light input coupler, coupling lightguide, light mixing region, lightguide region, and lightguide includes a cladding layer optically coupled to at least one surface. A cladding region, as used herein, is a layer optically coupled to a surface wherein the cladding layer includes a material with a refractive index, $n_{clad}$, less than the refractive index of the material, $n_m$, of the surface to which it is optically coupled. In a one embodiment, the average thickness of one or both cladding layers of the lightguide is less than one selected from the group: 100 microns, 60 microns, 30 microns, 20 microns, 10 microns, 6 microns, 4 microns, 2 microns, 1 micron, 0.8 microns, 0.5 microns, 0.3 microns, and 0.1 microns. In one embodiment, the cladding layer includes an adhesive such as a silicone-based adhesive, acrylate-based adhesive, epoxy, radiation curable adhesive, UV curable adhesive, or other light transmitting adhesive. Fluoropolymer materials may be used as a low refractive index cladding material. In one embodiment, the cladding region is optically coupled to one or more of the following: a lightguide, a lightguide region, a light mixing region, one surface of the lightguide, two surfaces of the lightguide, a light input coupler, coupling lightguides, and an outer surface of the film. In another embodiment, the cladding is disposed in optical contact with the lightguide, the lightguide region, or a layer or layers optically coupled to the lightguide and the cladding material is not disposed on one or more coupling lightguides.

In one embodiment, the cladding is one selected from the group: methyl based silicone pressure sensitive adhesive, fluoropolymer material (applied using a coating including a fluoropolymer substantially dissolved in a solvent), and a fluoropolymer film. The cladding layer may be incorporated to provide a separation layer between the core or core part of a lightguide region and the outer surface to reduce undesirable out-coupling (for example, frustrated totally internally reflected light by touching the film with an oily finger) from the core or core region of a lightguide. Components or objects such as additional films, layers, objects, fingers, dust etc. that come in contact or optical contact directly with a core or core region of a lightguide may couple light out of the lightguide, absorb light or transfer the totally internally reflected light into a new layer. By adding a cladding layer with a lower refractive index than the core, a portion of the light will totally internally reflect at the core-cladding layer interface. Cladding layers may also be used to provide the benefit of at least one of increased rigidity, increased flexural modulus, increased impact resistance, anti-glare properties, provide an intermediate layer for combining with other layers such as in the case of a cladding functioning as a tie layer or a base or substrate for an anti-reflection coating, a substrate for an optical component such as a polarizer, liquid crystal material, increased scratch resistance, provide additional functionality (such as a low-tack adhesive to bond the lightguide region to another element, a window "cling type" film such as a highly plasticized PVC). The cladding layer may be an adhesive, such as a low refractive index silicone adhesive which is optically coupled to another element of the device, the lightguide, the lightguide region, the light mixing region, the light input coupler, or a combination of one or more of the aforementioned elements or regions. In one embodiment, a cladding layer is optically coupled to a rear polarizer in a backlit liquid crystal display. In another embodiment, the cladding layer is optically coupled to a polarizer or outer surface of a front-lit display such as an electrophoretic display, e-book display, e-reader display, MEMs type display, electronic paper displays such as E-Ink® display by E Ink Corporation, reflective or partially reflective LCD display, cholesteric display, or other display capable of being illuminated from the front. In another embodiment, the cladding layer is an adhesive that bonds the lightguide or lightguide region to a component such as a substrate (glass or polymer), optical element (such as a polarizer, retarder film, diffuser film, brightness enhancement film, protective film (such as a protective polycarbonate film), the light input coupler, coupling lightguides, or other element of the light emitting device. In one embodiment, the cladding layer is separated from the lightguide or lightguide region core layer by at least one additional layer or adhesive.

In one embodiment, the cladding region is optically coupled to one or more surfaces of the light mixing region to prevent out-coupling of light from the lightguide when it is in contact with another component. In this embodiment, the cladding also enables the cladding and light mixing region to be physically coupled to another component.

Cladding Location

In one embodiment, the cladding region is optically coupled to at least one selected from the group: lightguide, lightguide region, light mixing region, one surface of the lightguide, two surfaces of the lightguide, light input coupler, coupling lightguides, and an outer surface of the film. In another embodiment, the cladding is disposed in optical contact with the lightguide, lightguide region, or layer or layers optically coupled to the lightguide and the cladding material is not disposed on one or more coupling lightguides. In one embodiment, the coupling lightguides do not include a cladding layer between the core regions in the region near the light input surface or light source. In another embodiment, the core regions may be pressed or held together and the edges may be cut and/or polished after stacking or assembly to form a light input surface or a light turning edge that is flat, curved, or a combination thereof. In another embodiment, the cladding layer is a pressure sensitive adhesive and the release liner for the pressure sensitive adhesive is selectively removed in the region of one or more coupling lightguides that are stacked or aligned together into an array such that the cladding helps maintain the relative position of the coupling lightguides relative to each other. In another embodiment, the protective liner is removed from the inner cladding regions of the coupling lightguides and is left on one or both outer surfaces of the outer coupling lightguides.

Lightguide Configuration and Properties

In one embodiment, the thickness of the film, lightguide and/or lightguide region is within a range of 0.005 mm to 0.5 mm. In another embodiment, the thickness of the film or lightguide is within a range of 0.025 mm (0.001 inches) to 0.5 mm (0.02 inches). In a further embodiment, the thickness of the film, lightguide and/or lightguide region is within a range of 0.050 mm to 0.175 mm. In one embodiment, the thickness of the film, lightguide or lightguide region is less than 0.2 mm or less than 0.5 mm. In one embodiment, one or more of a thickness, a largest thickness, an average thickness, a greater than 90% of the entire thickness of the film, a lightguide, and a lightguide region is less than 0.2 millimeters.

Optical Properties of the Lightguide or Light Transmitting Material

With regards to the optical properties of lightguides or light transmitting materials for certain embodiments, the optical properties specified herein may be general properties of the lightguide, the core, the cladding, or a combination thereof or they may correspond to a specific region (such as a light emitting region, light mixing region, or light extracting region), surface (light input surface, diffuse surface, flat surface), and direction (such as measured normal to the surface or measured in the direction of light travel through the lightguide).

Refractive Index of the Light Transmitting Material

In one embodiment, the core material of the lightguide has a higher refractive index than the cladding material. In one embodiment, the core is formed from a material with a refractive index ($n_D$) greater than one selected from the group: 1.3, 1.4, 1.5, 1.6, 1.7, 1.8, 1.9, 2.0, 2.1, 2.2, 2.3, 2.4, 2.5, 2.6, 2.7, 2.8, 2.9, and 3.0. In another embodiment, the refractive index ($n_D$) of the cladding material is less than one selected from the group: 1.1, 1.2, 1.3, 1.4, 1.5, 1.6, 1.7, 1.8, 1.9, 2.0, 2.1, 2.2, 2.3, 2.4, and 2.5.

Edges of the Lightguide

In one embodiment, the edges of the lightguide or lightguide region are coated, bonded to or disposed adjacent to a specularly reflecting material, partially diffusely reflecting material, or diffuse reflecting material. In one embodiment, the lightguide edges are coated with a specularly reflecting ink including nano-sized or micron-sized particles or flakes which reflect the light substantially specularly. In another embodiment, a light reflecting element (such as a specularly reflecting multi-layer polymer film with high reflectivity) is disposed near the lightguide edge and is disposed to receive light from the edge and reflect it and direct it back into the lightguide. In another embodiment, the lightguide edges are rounded and the percentage of light diffracted from the edge is reduced. One method of achieving rounded edges is by using a laser to cut the lightguide from a film and achieve edge rounding through control of the processing parameters (speed of cut, frequency of cut, laser power, etc.). In another embodiment, the edges of the lightguide are tapered, angled serrated, or otherwise cut or formed such that light from a light source propagating within the coupling lightguide reflects from the edge such that it is directed into an angle closer to the optical axis of the light source, toward a folded region, toward a bent region, toward a lightguide, toward a lightguide region, or toward the optical axis of the light emitting device. In a further embodiment, two or more light sources are disposed to each couple light into two or more coupling lightguides including light re-directing regions for each of the two or more light sources that include first and second reflective surfaces which direct a portion of light from the light source into an angle closer to the optical axis of the light source, toward a folded or bent region, toward a lightguide region, toward a lightguide region, or toward the optical axis of the light emitting device. In one embodiment, one or more edges of the coupling lightguides, the lightguide, the light mixing region, or the lightguide region include a curve or arcuate profile in the region of intersection between two or more surfaces of the film in a region.

Shape of the Lightguide

In one embodiment, at least a portion of the lightguide shape or lightguide surface is substantially planar, curved, cylindrical, a formed shape from a substantially planar film, spherical, partially spherical, angled, twisted, rounded, have a quadric surface, spheroid, cuboid, parallelepiped, triangular prism, rectangular prism, ellipsoid, ovoid, cone pyramid, tapered triangular prism, wave-like shape, and/or other known suitable geometrical solids or shapes. In one embodiment, the lightguide is a film formed into a shape by thermoforming or other suitable forming techniques. In another embodiment, the film or region of the film is tapered in at least one direction. In a further embodiment, a light emitting device includes a plurality of lightguides and a plurality of light sources physically coupled or arranged together (such as tiled in a 1×2 array for example). In another embodiment, the surface of the lightguide region of the film is substantially in the shape of a polygon, triangle, rectangle, square, trapezoid, diamond, ellipse, circle, semicircle, segment or sector of a circle, crescent, oval, annulus, alphanumeric character shaped (such as "U-shaped" or "T-shaped), or a combination of one or more of the aforementioned shapes. In another embodiment, the shape of the lightguide region of the film is substantially in the shape of a polyhedron, toroidal polyhedron, curved polyhedron, spherical polyhedron, rectangular cuboid, cuboid, cube, orthotope, stellation, prism, pyramid, cylinder, cone, truncated cone, ellipsoid, paraboloid, hyperboloid, sphere, or a combination of one or more of the aforementioned shapes.

Light Guide Material

In one embodiment, a light emitting device includes a lightguide or lightguide region formed from at least one light transmitting material. In one embodiment, the lightguide is a film includes at least one core region and at least one cladding region, each including at least one light transmitting material. In one embodiment, the light transmitting material is a thermoplastic, thermoset, rubber, polymer, high transmission silicone, glass, composite, alloy, blend, silicone, or other suitable light transmitting material, or a combination thereof. In one embodiment, a component or region of the light emitting device includes a suitable light transmitting material, such as one or more of the following: cellulose derivatives (e.g., cellulose ethers such as ethylcellulose and cyanoethylcellulose, cellulose esters such as cellulose acetate), acrylic resins, styrenic resins (e.g., polystyrene), polyvinyl-series resins [e.g., poly(vinyl ester) such as poly(vinyl acetate), poly(vinyl halide) such as poly(vinyl chloride), polyvinyl alkyl ethers or polyether-series resins such as poly(vinyl methyl ether), poly(vinyl isobutyl ether) and poly(vinyl t-butyl ether)], polycarbonate-series resins (e.g., aromatic polycarbonates such as bisphenol A-type polycarbonate), polyester-series resins (e.g., homopolyesters, for example, polyalkylene terephthalates such as polyethylene terephthalate and polybutylene terephthalate, polyalkylene naphthalates corresponding to the polyalkylene terephthalates; copolyesters including an alkylene terephthalate and/or alkylene naphthalate as a main component; homopolymers of lactones such as polycaprolactone), polyamide-series resin (e.g., nylon 6, nylon 66, nylon 610), urethane-series resins (e.g., thermoplastic polyurethane resins), copolymers of monomers forming the above resins [e.g., styrenic copolymers such as methyl methacrylate-styrene copolymer (MS resin), acrylonitrile-styrene copolymer (AS resin), styrene-(meth)acrylic acid copolymer, styrene-maleic anhydride copolymer and styrene-butadiene copolymer, vinyl acetate-vinyl chloride copolymer, vinyl alkyl ether-maleic anhydride copolymer]. Incidentally, the copolymer may be whichever of a random copolymer, a block copolymer, or a graft copolymer.

Lightguide Material with Adhesive Properties

In another embodiment, the lightguide includes a material with at least one selected from the group: chemical adhesion, dispersive adhesion, electrostatic adhesion, diffusive adhesion, and mechanical adhesion to at least one element of the light emitting device (such as a carrier film with a coating, an optical film, the rear polarizer in an LCD, a brightness enhancing film, another region of the lightguide, a coupling lightguide, a thermal transfer element such as a thin sheet including aluminum, or a white reflector film). In a further embodiment, at least one of the core material or cladding material of the lightguide is an adhesive material. In a further embodiment, at least one selected from the group: core material, cladding material, and a material disposed on a cladding material of the lightguide is at least one selected from the group: a pressure sensitive adhesive, a contact adhesive, a hot adhesive, a drying adhesive, a multi-part reactive adhesive, a one-part reactive adhesive, a natural adhesive, and a synthetic adhesive. In a further embodiment, the first core material of a first coupling lightguide is adhered to the second core material of a second coupling lightguide due to the adhesion properties of the first core material, second core material, or a combination thereof. In another embodiment, the cladding material of a first coupling lightguide is adhered to the core material of a second coupling lightguide due to the adhesion properties of the cladding material. In another embodiment, the first cladding material of a first coupling lightguide is adhered to the second cladding material of a second coupling lightguide due to the adhesion properties of the first cladding material, second cladding material, or a combination thereof. In one embodiment, the core layer is an adhesive and is coated onto at least one selected from the group: cladding layer, removable support layer, protective film, second adhesive layer, polymer film, metal film, second core layer, low contact area cover, and planarization layer. In another embodiment, the cladding material or core material has adhesive properties and has an ASTM D3330 Peel strength greater than one selected from the group: 8.929, 17.858, 35.716, 53.574, 71.432, 89.29, 107.148, 125.006, 142.864, 160.722, 178.580 kilograms per meter of bond width when adhered to an element of the light emitting device, such as for example without limitation, a cladding layer, a core layer, a low contact area cover, a circuit board, or a housing.

In another embodiment, a tie layer, primer, or coating is used to promote adhesion between at least one selected from the group: core material and cladding material, lightguide and housing, core material and element of the light emitting device, cladding material and element of the light emitting device. In one embodiment, the tie layer or coating includes a dimethyl silicone or variant thereof and a solvent. In another embodiment, the tie layer includes a phenyl based primer such as those used to bridge phenylsiloxane-based silicones with substrate materials. In another embodiment, the tie layer includes a platinum-catalyzed, addition-cure silicone primer such as those used to bond plastic film substrates and silicone pressure sensitive adhesives.

In a further embodiment, at least one region of the core material or cladding material has adhesive properties and is optical coupled to a second region of the core or cladding material such that the ASTM D1003 luminous transmittance through the interface is at least one selected from the group: 1%, 2%, 3%, and 4% greater than the transmission through the same two material at the same region with an air gap disposed between them.

In one embodiment, the core material of the lightguide includes a material with a critical surface tension less than one selected from the group: 33, 32, 30, 27, 25, 24 and 20 mN/m. In another embodiment, the core material has a critical surface tension less than one selected from the group: 33, 30, 27, 25, 24 and 20 mN/m and is surface treated to increase the critical surface tension to greater than one selected from the group: 27, 30, 33, 35, 37, 40, and 50. In one embodiment, the surface treatment includes exposing the surface to at least one selected from the group: a plasma, a flame, and a tie layer material. In one embodiment, the surface tension of the core material of the lightguide is reduced to reduce light extraction from a surface in contact due to "wet-out" and optical coupling. In another embodiment, the surface tension of the surface of the lightguide Multilayer Lightguide In one embodiment, the lightguide includes at least two layers or coatings. In another embodiment, the layers or coatings function as at least one selected from the group: a core layer, a cladding layer, a tie layer (to promote adhesion between two other layers), a layer to increase flexural strength, a layer to increase the impact strength (such as Izod, Charpy, Gardner, for example), and a carrier layer. In a further embodiment, at least one layer or coating includes a microstructure, surface relief pattern, light extraction features, lenses, or other non-flat surface features which redirect a portion of incident light from within the lightguide to an angle whereupon it escapes the lightguide in the region near the feature. For example, the carrier film may be a silicone film with embossed light extraction features disposed to receive a thermoset polycarbonate resin core region including a thermoset material In one embodiment, a thermoset material is coated onto a thermoplastic film wherein the thermoset material is the core material and the cladding material is the thermoplastic film or material. In another embodiment, a first thermoset material is coated onto a film including a second thermoset material wherein the first thermoset material is the core material and the cladding material is the second thermoset plastic.

Light Extraction Method

In one embodiment, one or more of the lightguide, the lightguide region, and the light emitting region includes at least one light extraction feature or region. In one embodiment, the light extraction region may be a raised or recessed surface pattern or a volumetric region. Raised and recessed surface patterns include, without limitation, scattering material, raised lenses, scattering surfaces, pits, grooves, surface modulations, microlenses, lenses, diffractive surface features, holographic surface features, photonic bandgap features, wavelength conversion materials, holes, edges of layers (such as regions where the cladding is removed from covering the core layer), pyramid shapes, prism shapes, and other geometrical shapes with flat surfaces, curved surfaces, random surfaces, quasi-random surfaces, and combinations thereof. The volumetric scattering regions within the light extraction region may include dispersed phase domains, voids, absence of other materials or regions (gaps, holes), air gaps, boundaries between layers and regions, and other refractive index discontinuities or inhomogeneities within the volume of the material different that co-planar layers with parallel interfacial surfaces.

In one embodiment, the light extraction feature is substantially directional and includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, an extruded mixture, a blended materials, an alloy of materials, a composite of symmetric or asymmetrically shaped materials, a laser ablated surface feature, an embossed surface feature, a coated surface feature, an injection molded surface feature, an extruded surface feature, and one of the aforementioned features disposed in the volume of the lightguide. For example, in one embodiment, the directional light extraction feature is a 100 micron long, 45 degree angled facet groove formed by UV cured embossing a coating on the lightguide film that substantially directs a portion of the incident light within the lightguide toward 0 degrees from the surface normal of the lightguide.

In one embodiment, the light extraction feature is a specularly, diffusive, or a combination thereof reflective material. For example, the light extraction feature may be a substantially specularly reflecting ink disposed at an angle (such as coated onto a groove) or the light extraction feature may be a substantially diffusely reflective ink such as an ink including titanium dioxide particles within a methacrylate-based binder.

Multiple Lightguides

In one embodiment, a light emitting device includes more than one lightguide to provide one or more of the following: color sequential display, localized dimming backlight, red, green, and blue lightguides, animation effects, multiple messages of different colors, NVIS and daylight mode backlight (one lightguide for NVIS, one lightguide for daylight for example), tiled lightguides or backlights, and large area light emitting devices including smaller light emitting devices. In another embodiment, a light emitting device includes a plurality of lightguides optically coupled to each other. In another embodiment, at least one lightguide or a component thereof includes a region with anti-blocking features such that the lightguides do not substantially couple light directly into each other due to touching.

Multiple Lightguides to Provide Pixelated Color

In one embodiment, a light emitting device includes a first lightguide and second lightguide disposed to receive light from a first and second light source, respectively, through two different optical paths wherein the first and second light source emit light of different colors and the light emitting regions of the first and second lightguides include pixelated regions spatially separated in the plane including the light output plane of the light emitting device at the pixelated regions (for example, separated in the thickness direction of the film-based lightguides).

Lightguide Folding Around Components

In one embodiment, at least one selected from the group: lightguide, lightguide region, light mixing region, plurality of lightguides, coupling lightguides, and light input coupler bends or folds such that the component other components of the light emitting device are hidden from view, located behind another component or the light emitting region, or are partially or fully enclosed. These components around which they may bend or fold include components of the light emitting device such as light source, electronics, driver, circuit board, thermal transfer element, spatial light modulator, display, housing, holder, or other components such that the components are disposed behind the folded or bent lightguide or other region or component. In one embodiment, a frontlight for a reflective display includes a lightguide, coupling lightguides and a light source wherein one or more regions of the lightguide are folded and the light source is disposed substantially behind the display. In one embodiment, the light mixing region includes a fold and the light source and/or coupling lightguides are substantially disposed on the side of the film-based lightguide opposite the light emitting region of the device or reflective display. In one embodiment, a reflective display includes a lightguide that is folded such that a region of the lightguide is disposed behind the reflective spatial light modulator of the reflective display. In one embodiment, the fold angle is between 150 and 210 degrees in one plane. In another embodiment, the fold angle is substantially 180 degrees in one plane. In one embodiment, the fold is substantially 150 and 210 degrees in a plane parallel to the optical axis of the light propagating in the film-based lightguide. In one embodiment, more than one input coupler or component is folded behind or around the lightguide, light mixing region or light emitting region. In this embodiment, for example, two light input couplers from opposite sides of the light emitting region of the same film may be disposed adjacent each other or utilize a common light source and be folded behind the spatial light modulator of a display. In another embodiment, tiled light emitting devices include light input couplers folded behind and adjacent or physically coupled to each other using the same or different light sources. In one embodiment, the light source or light emitting area of the light source is disposed within the volume bounded by the edge of the light emitting region and the normal to the light emitting region on the side of the lightguide opposite the viewing side. In another embodiment, at least one of the light source, light input coupler, coupling lightguides, or region of the light mixing region is disposed behind the light emitting region (on the side of the lightguide opposite the viewing side) or within the volume bounded by the edge of the light emitting region and the normal to the light emitting region on the side of the lightguide opposite the viewing side.

In another embodiment, the lightguide region, light mixing region, or body of the lightguide extends across at least a portion of the array of coupling lightguides or a light emitting device component. In another embodiment, the lightguide region, light mixing region, or body of the lightguide extends across a first side of the array of coupling lightguides or a first side of the light emitting device component. In a further embodiment, the lightguide region, light mixing region or body of the lightguide extends across a first side and a second side of the array of coupling lightguides. For example, in one embodiment, the body of a film-based lightguide extends across two sides of a stack of coupling lightguides with a substantially rectangular cross section. In one embodiment, the stacked array of coupling lightguides is oriented in a first orientation direction substantially parallel to their stacked surfaces toward the direction of light propagation within the coupling lightguides, and the light emitting region is oriented in a second direction parallel to the optical axis of light propagating within the light emitting region where the orientation difference angle is the angular difference between the first orientation direction and the second orientation direction. In one embodiment, the orientation difference angle is selected from the group: 0 degrees, greater than 0 degrees, greater than 0 degrees and less than 90 degrees, between 70 degrees and 110 degrees, between 80 degrees and 100 degrees, greater than 0 degrees and less than 180 degrees, between 160 degrees and 200 degrees, between 170 degrees and 190 degrees, and greater than 0 degrees and less than 360 degrees.

In one embodiment, at least one selected from the group: lightguide, lightguide region, light mixing region, plurality of lightguides, coupling lightguides, and light input coupler bends or folds such that it wraps around a component of the light emitting device more than once. For example, in one embodiment, a lightguide wraps around the coupling lightguides two times, three times, four times, five times, or more than five times. In another embodiment, the lightguide, lightguide region, light mixing region, plurality of lightguides, coupling lightguides, or light input coupler may bend or fold such that it wraps completely around a component of the light emitting device and partially wraps again around. For example, a lightguide may wrap around a relative position maintaining element 1.5 times (one time around and half way around again). In another embodiment, the lightguide region, light mixing region or body of the lightguide further extends across a third, fourth, fifth, or sixth side of the array of coupling lightguides or light emitting device component. For example, in one embodiment, the light mixing region of a film-based lightguide extends completely around four sides of the relative position maintaining element plus across a side again (fifth side). In another example, the light mixing region wraps around a stack of coupling lightguides and relative position maintaining element more than three times.

In one embodiment, wrapping the lightguide, lightguide region, light mixing region, plurality of lightguides, coupling lightguides, or light input coupler around a component provides a compact method for extending the length of a region of the lightguide. For example, in one embodiment, the light mixing region is wrapped around the stack of coupling lightguides to increase the light mixing distance within the light mixing region such that the spatial color or the light flux uniformity of the light entering the light emitting region is improved.

In one embodiment, the wrapped or extended region of the lightguide is operatively coupled to the stack of coupling lightguides or a component of the light emitting device. In one embodiment, the wrapped or extended region of the lightguide is held with adhesive to the stack of coupling lightguides or the component of the light emitting device. For example, in one embodiment, the light mixing region includes a pressure sensitive adhesive cladding layer that extends or wraps and adheres to one or more surfaces of one or more coupling lightguides or to the component of the light emitting device. In another embodiment, the light mixing region includes a pressure sensitive adhesive layer that adheres to at least one surface of a relative position maintaining element. In another embodiment, a portion of the film-based lightguide includes a layer that extends or wraps to one or more surfaces of one or more coupling lightguides or a component of the light emitting device. In another embodiment, the wrapped or extended region of the lightguide extends across one or more surfaces or sides, or wraps around one or more light sources. The wrapping or extending of a lightguide or lightguide region across one or more sides or surfaces of the stack of coupling lightguides or the component of the light emitting device, may occur by physically translating or rotating the lightguide or the lightguide region, or may occur by rotating the stack of coupling lightguides or the component. Thus, the physical configuration does not require a particular method of achieving the wrapping or extending.

Multiple Bends in the Lightguide

In one embodiment, a film-based lightguide includes two bends in the film. In another embodiment, the two bends in the film-based lightguide are within the same plane and in the light mixing region of the film. For example, in one embodiment, a film-based lightguide operatively coupled to the top of a frame includes a first bend to fold a light mixing region behind the frame to position at least one of a light source, a light input coupler, and a relative position maintaining element behind the light emitting region of the lightguide. In this embodiment, the lightguide includes a second bend that positions at least one of the light source, light input coupler, and relative position maintaining element at a distance from the light emitting region of the lightguide in the thickness direction less than the diameter of the first bend. In this embodiment, the second bend can bring the component(s) closer to the light emitting region than the single bend for long light mixing regions. Similarly, a large first bend (such as a first bend with a first bend angle greater than 180 degrees) can position at least one of a light source, light input coupler, and relative position maintaining element closer to the light emitting region and behind the light emitting region of the lightguide. In one embodiment, a method of manufacturing a light emitting device includes bending a film-based lightguide at a first bend with a first bend diameter such that a portion of the light mixing region is disposed behind the light emitting region of the lightguide and the distance between the light emitting region of the lightguide and the portion of the light mixing region behind the light emitting region is less than the first bend diameter. In another embodiment, a method of manufacturing a light emitting device includes bending a film-based lightguide at a first bend with a first bend diameter that positions a first portion of the light mixing region behind the light emitting region of the lightguide, and bending the lightguide at a second bend that positions a second portion of the light mixing region of the lightguide such that the distance between the light emitting region of the lightguide and the second portion of the light mixing region behind the light emitting region is less than the first bend diameter of the first bend.

In another embodiment, the lightguide further includes a planar region between the second bend and at least one of the light source, the light input coupler, and the relative position maintaining element. For example, in one embodiment, the length of the light mixing region of a film based lightguide is greater than 50% of the length of the light emitting region and the lightguide includes a first bend to position the light source and the light mixing region of the lightguide behind the light emitting region. The volume of the device can be reduced by including a second bend in the lightguide that brings the light mixing region closer to the light emitting region. In this embodiment, the lightguide can be operatively coupled to a frame on the top and bottom surfaces of the frame and the diameter of the first bend (or the maximum separation between the inner surfaces of the film) is greater than the average separation between the lower surface of the light emitting region of the lightguide and the upper surface of the light mixing region positioned underneath the light emitting region. In another embodiment, the light source and/or at least one coupling lightguide is positioned at a distance from the light emitting region of the lightguide less than the diameter of the first bend or the maximum separation between the inner surfaces of the film. In another embodiment, shape of the lightguide further includes an inflection point in a plane including the first bend. In one embodiment, the lightguide extends from the relative position maintaining element (or the housing comprising the relative position maintaining element) at the top side or the bottom side wherein the top side of the relative position maintaining element is closer to the light mixing region when the lightguide is folded such that the relative position maintaining element is below the light emitting region of the lightguide.

In another embodiment, the tapered edge of the tapered light mixing region has an extended direction length, $L_t$, and a displacement, $D_t$, from the lateral edge of the lightguide in the light emitting region. In one embodiment, $L_t/D_t$ is greater than or equal to one selected from the group: 0.2, 0.5, 1, 2, 3, 4, 5, 8, 10, and 20. In another embodiment, $D_t$ is greater than one selected from the group: 2, 4, 6, 8, 10, 20, 50, 75, 100, and 200 millimeters. In a further embodiment, $L_t$ is greater than one selected from the group: 2, 4, 6, 8, 10, 20, 50, 75, 100, and 200 millimeters. In another embodiment, $L_t$ is greater than the thickness of a light collimating optical element parallel to its optical axis positioned to receive light from the light source and direct it toward the input surface of coupling lightguides extended from the film-based lightguide with a tapered light mixing region. In a further embodiment, $L_t$ is greater than the thickness of a light source plus the thickness of the light collimating optical element parallel to the optical axis of the light collimating optical element positioned to receive light from the light source and direct it toward the input surface of coupling lightguides extended from the film-based lightguide with the tapered light mixing region. In one embodiment the length of the light mixing region of the lightguide is larger than the length of the light emitting region and the light source and/or the coupling lightguides do not extend past the light emitting area of the lightguide in the length direction.

In another embodiment, the lightguide further includes a third bend in the same plane as the first bend and the second bend. In this embodiment, the light mixing region of the film based lightguide can be folded behind the light emitting region, bent closer to the light emitting region and be folded again onto itself to accommodate a long light mixing region. In one embodiment, the lightguide includes one or more bends or folds wherein each bend may positions the lightguide closer to another region of the lightguide and/or fold one region of the lightguide upon (or behind or above) another region of the lightguide. In one embodiment, the diameter of the bend that folds the first region of the lightguide behind the second region of the lightguide is the same as or greater than the average distance of the second region to the first region beneath, behind, or above the light emitting region of the lightguide. In one embodiment, the light mixing region of the lightguide includes the first region of the lightguide and the second region of the lightguide on opposite sides of the fold in the lightguide. In one embodiment, the first region of the lightguide is the light emitting region and the light mixing region includes the second region on the opposite side of the fold as the first region. In one embodiment, the ratio of the length of the light mixing region to the length of the light emitting region is greater than one selected from the group: 0.1, 0.2, 0.4, 0.6, 0.8, 1, 1.2, 1.4, 1.6, 1.8, 2, 3, and 4.

In one embodiment, one or more bends of a lightguide has a bend angle, the average angle formed between two substantially planar regions on both sides of a bend or the angle proceeding or following an inflection point in the lightguide, selected from the group: greater than 5, greater than 10, 20-70, 30-50, 45, 60-120, 70-110, 80-100, 90, 115-155, 120-150, 135, 150-210, 160-200, 170-190, 175-185, 180, greater than 180, 195-255, 205-245, 215-235, 220-230, 225, 240-300, 250-290, 260-250, 265-275, 270, 285-345, 295-335, 305-325, 310-320, 315, 330-390, 340-380, 350-370, 355-365, 360, and greater than 0 and less than 360 degrees. For example, in one embodiment, a lightguide includes a first bend with a first bend angle of 180 degrees that bends the lightguide back under itself, and a second bend with a bend angle of 45 degrees that bends the lightguide closer to the light emitting region of the lightguide before the first bend. The lightguide in this example, could further include a third bend with a bend angle of 45 degrees that bends the light mixing region of the lightguide back to parallel to (and beneath) the light emitting region.

Light Absorbing Region or Layer

In one embodiment, one or more of the cladding, the adhesive, the layer disposed between the lightguide and lightguide region and the outer light emitting surface of the light emitting device, a patterned region, a printed region, and an extruded region on one or more surfaces or within a volume of the film includes a light absorbing material which absorbs a first portion of light in a first predetermined wavelength range.

Adhesion Properties of the Lightguide, Film, Cladding or Other Layer

In one embodiment, one or more of the lightguide, the core material, the light transmitting film, the cladding material, and a layer disposed in contact with a layer of the film has adhesive properties or includes a material with one or more of the following: chemical adhesion, dispersive adhesion, electrostatic adhesion, diffusive adhesion, and mechanical adhesion to at least one element of the light emitting device (such as a carrier film with a coating, an optical film, the rear polarizer in an LCD, a brightness enhancing film, another region of the lightguide, a coupling lightguide, a thermal transfer element such as a thin sheet including aluminum, or a white reflector film) or an element external to the light emitting device such as a window, wall, or ceiling.

Light Redirecting Element Disposed to Redirect Light from the Light Guide

In one embodiment, a light emitting device includes a lightguide with light redirecting elements disposed on or within the lightguide and light extraction features disposed in a predetermined relationship relative to one or more light redirecting elements. In another embodiment, a first portion of the light redirecting elements are disposed above a light extraction feature in a direction substantially perpendicular to the light emitting surface, lightguide, or lightguide region.

Light Redirecting Element

As used herein, the light redirecting element is an optical element which redirects a portion of light of a first wavelength range incident in a first angular range into a second angular range different than the first. In one embodiment, the light redirecting element includes at least one element selected from the group: refractive features, totally internally reflected feature, reflective surface, prismatic surface, microlens surface, diffractive feature, holographic feature, diffraction grating, surface feature, volumetric feature, and lens. In a further embodiment, the light redirecting element includes a plurality of the aforementioned elements. The plurality of elements may be in the form of a 2-D array (such as a grid of microlenses or close-packed array of microlenses), a one-dimensional array (such as a lenticular lens array), random arrangement, predetermined non-regular spacing, semi-random arrangement, or other predetermined arrangement. The elements may include different features, with different surface or volumetric features or interfaces and may be disposed at different thicknesses within the volume of the light redirecting element, lightguide, or lightguide region. The individual elements may vary in the x, y, or z direction by at least one selected from the group: height, width, thickness, position, angle, radius of curvature, pitch, orientation, spacing, cross-sectional profile, and location in the x, y, or z axis.

Location of the Film-Based Lightguide

In one embodiment, the core region of the film-based lightguide is positioned between two layers selected from the group: hardcoating substrate, layer, or adhesive; anti-glare layer or anti-reflection layer, substrate or adhesive; color filter material, layer, substrate, or adhesive; first cladding of the lightguide; second cladding of the lightguide; cladding substrate or adhesive; film-based lightguide adhesive; electro-optic layer (such as liquid crystal layer or electrophoretic layer, for example); viewer side substrate for the electro-optic layer; substrate for the electro-optic layer on non-viewer side; adhesive or substrate for the electro-optic layer; reflective material, film, layer, or substrate or adhesive for reflective layer; polarizer layer substrate, or adhesive for polarizer; light redirecting layer; light extraction feature film; impact protection layer; internal coating; conformal coating; circuit board; flexible connector; thermally conducting film, layer (such as a stainless steel, copper, or aluminum foil layer), substrate, or adhesive; sealant layer, film substrate or adhesive; air gap layer; spacer layer or substrate for the spacer layer; electrically conducting layer (transparent or opaque), substrate, or adhesive; anode layer, substrate, or adhesive for anode layer; cathode layer, substrate or adhesive for cathode layer; active matrix layer, substrate or adhesive for active matrix layer; passive matrix layer, substrate or adhesive for passive matrix layer; and touchscreen layer, substrate for touchscreen, or adhesive for touchscreen layer. In another embodiment, the film-based lightguide functions as one or more of the aforementioned layers in addition to propagating light in a waveguide condition.

In one embodiment, the film based lightguide is positioned between the color filter layer and the electro-optical layer such that the parallax effects due to high angle light are minimized (thus resulting in higher contrast, greater resolution, or increased brightness). In another embodiment, the film-based lightguide is the substrate for the color filter material or layer. In another embodiment, the film-based lightguide is the substrate for the electro-optic material or layer.

In one embodiment, the distance between the light extraction features and the color filters in a multi-color display is minimized by positioning the film-based lightguide within the display or using the film-based lightguide as a substrate for a layer or material of the display (such as, for example, the substrate for the color filter layer, transparent conductor layer, adhesive layer, or electro-optical material layer). In one embodiment, the light emitting device includes a plurality of light absorbing adhesive regions that adhere to one or more layers of the display or film-based lightguide (such as on the cladding layer of the film-based lightguide or on the electro-optical material layer).

In one embodiment, the light emitting device includes a film-based lightguide and a force sensitive touchscreen wherein the film based lightguide is sufficiently thin to permit a force sensitive touchscreen to function by finger pressure on the display.

In one embodiment, a film-based lightguide frontlight is disposed between a touchscreen film and a reflective spatial light modulator. In another embodiment, a touchscreen film is disposed between the film-based lightguide and the reflective spatial light modulator. In another embodiment, the reflective spatial light modulator, the film-based lightguide frontlight and the touchscreen are all film-based devices and the individual films may be laminated together. In another embodiment, the light transmitting electrically conductive coating for the touchscreen device or the display device is coated onto the film-based lightguide frontlight. In a further embodiment, the film-based lightguide is physically coupled to the flexible electrical connectors of the display or the touchscreen. In one embodiment, the flexible connector is a "flexible cable", "flex cable," "ribbon cable," or "flexible harness" including a rubber film, polymer film, polyimide film, polyester film or other suitable film.

In one embodiment, a reflective display includes one or more film-based lightguides disposed within or adjacent to one or more regions selected from the group: the region between the touchscreen layer and the reflective light modulating pixels, the region on the viewing side of the touchscreen layer, the region between a diffusing layer and the reflective light modulating pixels, the viewing side of the diffusing layer in a reflective display, the region between a diffusing layer and the light modulating pixels, the region between the diffusing layer and the reflective element, the region between the light modulating pixels and a reflective element, the viewing side of a substrate for a component or the light modulating pixels, the reflective display, between the color filters and the spatial light modulating pixels, the viewing side of the color filters, between the color filters and the reflective element, the substrate for the color filter, the substrate for the light modulating pixels, the substrate for the touchscreen, the region between a protective lens and the reflective display, the region between a light extraction layer and the light modulating pixels, the region on the viewing side of a light extraction layer, the region between an adhesive and a component of a reflective display, and between two or more components of a reflective display known in the art. In the aforementioned embodiment, the film-based lightguide may include volumetric light extraction features or light extraction features on one or more surfaces of the lightguide and the lightguide may include one or more lightguide regions, one or more cladding regions, or one or more adhesive regions.

In one embodiment, the film-based lightguide is folded around a first edge of the active area of a reflective spatial light modulator behind a reflective spatial light modulator and one or more selected from the group: a touchscreen connector, touchscreen film substrate, reflective spatial light modulator connector, and reflective spatial light modulator film substrate is folded behind the first edge, a second edges substantially orthogonal to the first edge, or an opposite edge to the first edge. In the aforementioned embodiment, a portion of the lightguide region, light mixing region, or coupling lightguide includes the bend region of the fold and may extend beyond the reflective spatial light modulator flexible connector, reflective spatial light modulator substrate, touchscreen flexible connector or touchscreen flexible substrate.

Backlight or Frontlight

In one embodiment, the film-based lightguide illuminates a display, forming an electroluminescent display. In one embodiment, the film based lightguide is a frontlight for a reflective or transflective display. In another embodiment, the film-based lightguide is a backlight for a transmissive or transflective display. Typically, with displays including light emitting lightguides for illumination, the location of the lightguide will determine whether or not it is considered a backlight or frontlight for an electroluminescent display where traditionally a frontlight lightguide is a lightguide disposed on the viewing side of the display (or light modulator) and a backlight lightguide is a lightguide disposed on the opposite side of the display (or light modulator) than the viewing side. However, the frontlight or backlight terminology to be used can vary in the industry depending on the definition of the display or display components, especially in the cases where the illumination is from within the display or within components of the spatial light modulator (such as the cases where the lightguide is disposed in-between the liquid crystal cell and the color filters or in-between the liquid crystal materials and a polarizer in an LCD). In some embodiments, the lightguide is sufficiently thin to be disposed within a spatial light modulator, such as between light modulating pixels and a reflective element in a reflective display. In this embodiment, light can be directed toward the light modulating pixels directly or indirectly by directing light to the reflective element such that is reflects and passes through the lightguide toward the spatial light modulating pixels. In one embodiment, a lightguide emits light from one side or both sides and with one or two light distribution profiles that contribute to the "front" and/or "rear" illumination of light modulating components. In embodiments disclosed herein, where the light emitting region of the lightguide is disposed between the spatial light modulator (or electro-optical regions of the pixels, sub-pixels, or pixel elements) and a reflective component of a reflective display, the light emitting from the light emitting region may propagate directly toward the spatial light modulator or indirectly via directing the light toward a reflective element such that the light reflected passes back through the lightguide and into the spatial light modulator. In this specific case, the terms "frontlight" and "backlight" used herein may be used interchangeably.

In one embodiment, a light emitting display backlight or frontlight includes a light source, a light input coupler, and a lightguide. In one embodiment, the frontlight or backlight illuminates a display or spatial light modulator selected from the group: transmissive display, reflective display, liquid crystal displays (LCD's), MEMs based display, electrophoretic displays, cholesteric display, time-multiplexed optical shutter display, color sequential display, interferometric modulator display, bistable display, electronic paper display, LED display, TFT display, OLED display, carbon nanotube display, nanocrystal display, head mounted display, head-up display, segmented display, passive matrix display, active matrix display, twisted nematic display, in-plane switching display, advanced fringe field switching display, vertical alignment display, blue phase mode display, zenithal bistable device, reflective LCD, transmissive LCD, electrostatic display, electrowetting display, bistable TN displays, micro-cup EPD displays, grating aligned zenithal display, photonic crystal display, electrofluidic display, and electrochromic displays.

LCD Backlight or Frontlight

In one embodiment, a backlight or frontlight suitable for use with a liquid crystal display panel includes at least one light source, light input coupler, and lightguide. In one embodiment, the backlight or frontlight includes a single lightguide wherein the illumination of the liquid crystal panel is white. In another embodiment, the backlight or frontlight includes a plurality of lightguides disposed to receive light from at least two light sources with two different color spectra such that they emit light of two different colors. In another embodiment, the backlight or frontlight includes a single lightguide disposed to receive light from at least two light sources with two different color spectra such that they emit light of two different colors. In another embodiment, the backlight or frontlight includes a single lightguide disposed to receive light from a red, green and blue light source. In one embodiment, the lightguide includes a plurality of light input couplers wherein the light input couplers emit light into the lightguide with different wavelength spectrums or colors. In another embodiment, light sources emitting light of two different colors or wavelength spectrums are disposed to couple light into a single light input coupler. In this embodiment, more than one light input coupler may be used and the color may be controlled directly by modulating the light sources.

In a further embodiment, the backlight or frontlight includes a lightguide disposed to receive light from a blue or UV light emitting source and further includes a region including a wavelength conversion material such as a phosphor film. In another embodiment, the backlight includes 3 layers of film lightguides wherein each lightguide illuminates a display with substantially uniform luminance when the corresponding light source is turned on. In this embodiment, the color gamut can be increased by reducing the requirements of the color filters and the display can operate in a color sequential mode or all-colors-on simultaneously mode. In a further embodiment, the backlight or frontlight includes 3 layers of film lightguides with 3 spatially distinct light emitting regions including light extraction features wherein each light extraction region for a particular lightguide corresponds to a set of color pixels in the display. In this embodiment, by registering the light extracting features (or regions) to the corresponding red, green, and blue pixels (for example) in a display panel, the color filters are not necessarily needed and the display is more efficient. In this embodiment, color filters may be used, however, to reduce crosstalk.

Reflective Display

In one embodiment, a method of producing a display includes: forming an array of coupling lightguides from a lightguide region of a film including a core region and a cladding region by separating the coupling lightguides from each other such that they remain continuous with the lightguide region of the film and include bounding edges at the end of the coupling lightguides; folding the plurality of coupling lightguides such that the bounding edges are stacked; directing light from a light source into the stacked bounding edges such that light from the light source propagates within the core region through the coupling lightguides and lightguide region of the film by total internal reflection; forming light extraction features on or within the core layer in a light emitting region of the lightguide region of the film; disposing a light extracting region on the cladding region or optically coupling a light extracting region to the cladding region in a light mixing region of the lightguide region between the coupling lightguides and the light emitting region; and disposing the light emitting region adjacent a reflective spatial light modulator.

Multiple Light Emitting Areas or Displays

In one embodiment, the light emitting device includes two or more light emitting areas or displays defined by regions with one or more properties selected from the group: emit different color gamuts; emit light within different functional areas of the display; emit light with different angular properties; emit light to illuminate a button, key, keyboard area, or other user interface region; have different sizes or shapes; and are positioned on different sides or surfaces of the device. In one embodiment, the light emitting device includes two or more light emitting regions with different use modes or different illumination modes. A different illumination mode can include one or more different light output properties selected from the group: different times in the "on" state or "off" state of illumination; different frequencies of illumination; different durations of illumination; different colors of illumination; different color gamuts; different angular light output profiles; different spatial light output profiles; different spatial luminance uniformity; and different color, luminances or luminous intensity at a specific angle. For example, in one embodiment, the light emitting device illuminates a main display and a sub-display. The main display and sub-display could be two light emitting areas defined by the same spatial light modulator or two light emitting areas defined by two separate spatial light modulators. In one embodiment, each light emitting area or display may be illuminated by the same or different lightguides and/or light sources. For example, in one embodiment, the light emitting device has a high color gamut lightguide positioned to illuminate the main display of a device with a main display and sub-display from the front in a first mode using light from monochrome red, green, and blue LEDs. In this embodiment, the sub-display can be illuminated by a second lightguide that emits only white light to reduce the power required for illuminating the sub-display (which could include icons or keys, for example) to the same luminance. In another embodiment, a first display region includes an array of color filters and a second display region does not include an array of color filters. For example, in one embodiment, the sub-display may be designed without a color filter array such that the monochrome sub-display illuminated by a white (or monochrome) light source can operate at a significantly lower power for the same luminance as the main display with color filters since light is not absorbed by a color filter array.

In one embodiment, the device includes two or more lightguides spatially separated in the plane of the active area of the light emitting device such that they can be illuminated independently. In this embodiment, for example, the edges of one or more lightguides opposite the side of the lightguide with the light input coupler may include a light reflective or absorptive coating to prevent light from exiting one lightguide and entering into an adjacent lightguide. In one embodiment, the spatially separated lightguides permit the light emitting display device to have a substantially uniform thickness.

Light Emitting Device Assembly

In one embodiment, the film-based lightguide is adhered to a display, component of a display, or other component of a light emitting device using lamination and/or one or more of the following: addition of pressure, addition of heat, laminating a coated layer or region, laminating to a relative position maintaining element, and coating an adhesive onto a substrate or component and joining one component to another.

In one embodiment, the adhesive functions as a cladding between the core region of the lightguide and another component, and reduces the flux of light absorbed by the RPME due to the lightguide contacting the RPME. In another embodiment, the pressure sensitive adhesive increases the yield strength or impact strength (Izod or Charpy impact strength, for example) of the film-based lightguide, light emitting device, and/or display. In one embodiment, an adhesive is positioned between the lightguide and a reflective film, surface of the relative position maintaining element, or optical component disposed to receive light from the light source and direct it into the input surface of the stack of coupling lightguides.

Method of Manufacturing Light Input/Output Coupler

In one embodiment, the lightguide and light input or output coupler are formed from a light transmitting film by creating segments of the film corresponding to the coupling lightguides and translating and bending the segments such that a plurality of segments overlap. In a further embodiment, the input surfaces of the coupling lightguides are arranged to create a collective light input surface by translation of the coupling lightguides to create at least one bend or fold.

Film Production

In one embodiment, the film or lightguide is one selected from the group: extruded film, co-extruded film, cast film, solvent cast film, UV cast film, pressed film, injection molded film, knife coated film, spin coated film, and coated film. In one embodiment, one or two cladding layers are co-extruded on one or both sides of a lightguide region. In another embodiment, tie layers, adhesion promotion layers, materials or surface modifications are disposed on a surface of or between the cladding layer and the lightguide layer. In one embodiment, the coupling lightguides, or core regions thereof, are continuous with the lightguide region of the film as formed during the film formation process. For example, coupling lightguides formed by slicing regions of a film at spaced intervals can form coupling lightguides that are continuous with the lightguide region of the film. In another embodiment, a film-based lightguide with coupling lightguides continuous with the lightguide region can be formed by injection molding or casting a material in a mold including a lightguide region with coupling lightguide regions with separations between the coupling lightguides. In one embodiment, the region between the coupling lightguides and lightguide region is homogeneous and without interfacial transitions such as without limitation, air gaps, minor variations in refractive index, discontinuities in shapes or input-output areas, and minor variations in the molecular weight or material compositions.

In another embodiment, at least one selected from the group: lightguide layer, light transmitting film, cladding region, adhesive region, adhesion promotion region, or scratch resistant layer is coated onto one or more surfaces of the film or lightguide. In another embodiment, the lightguide or cladding region is coated onto, extruded onto or otherwise disposed onto a carrier film. In one embodiment, the carrier film permits at least one selected from the group: easy handling, fewer static problems, the ability to use traditional paper or packaging folding equipment, surface protection (scratches, dust, creases, etc.), assisting in obtaining flat edges of the lightguide during the cutting operation, UV absorption, transportation protection, and the use of winding and film equipment with a wider range of tension and flatness or alignment adjustments. In one embodiment, the carrier film is removed before coating the film, before bending the coupling lightguide, after folding the coupling lightguides, before adding light extraction features, after adding light extraction features, before printing, after printing, before or after converting processes (further lamination, bonding, die cutting, hole punching, packaging, etc.), just before installation, after installation (when the carrier film is the outer surface), and during the removal process of the lightguide from installation. In one embodiment, one or more additional layers are laminated in segments or regions to the core region (or layers coupled to the core region) such that there are regions of the film without the one or more additional layers. For example, in one embodiment, an optical adhesive functioning as a cladding layer is optically coupled to a touchscreen substrate; and an optical adhesive is used to optically couple the touchscreen substrate to the light emitting region of film-based lightguide, thus leaving the coupling lightguides without a cladding layer for increased input coupling efficiency.

In another embodiment, the carrier film is slit or removed across a region of the coupling lightguides. In this embodiment, the coupling lightguides can be bent or folded to a smaller radius of curvature after the carrier film is removed from the linear fold region.

Relative Position Maintaining Element

In one embodiment, at least one relative position maintaining element substantially maintains the relative position of the coupling lightguides in the region of the first linear fold region, the second linear fold region or both the first and second linear fold regions. In one embodiment, the relative position maintaining element is disposed adjacent the first linear fold region of the array of coupling lightguides such that the combination of the relative position maintaining element with the coupling lightguide provides sufficient stability or rigidity to substantially maintain the relative position of the coupling lightguides within the first linear fold region during translational movements of the first linear fold region relative to the second linear fold region to create the overlapping collection of coupling lightguides and the bends in the coupling lightguides. The relative position maintaining element may be adhered, clamped, disposed in contact, disposed against a linear fold region or disposed between a linear fold region and a lightguide region. The relative position maintaining element may be a polymer or metal component that is adhered or held against the surface of the coupling lightguides, light mixing region, lightguide region or film at least during one of the translational steps. In one embodiment, the relative position maintaining element is a polymeric strip with planar or saw-tooth-like teeth adhered to either side of the film near the first linear fold region, second linear fold region, or both first and second linear fold regions of the coupling lightguides. By using saw-tooth-like teeth, the teeth can promote or facilitate the bends by providing angled guides. In another embodiment, the relative position maintaining element is a mechanical device with a first clamp and a second clamp that holds the coupling lightguides in relative position in a direction parallel to the clamps parallel to the first linear fold region and translates the position of the clamps relative to each other such that the first linear fold region and the second linear fold region are translated with respect to each other to create overlapping coupling lightguides and bends in the coupling lightguides. In another embodiment, the relative position maintaining element maintains the relative position of the coupling lightguides in the first linear fold region, second linear fold region, or both the first and second linear fold regions and provides a mechanism to exert force upon the end of the coupling lightguides to translate them in at least one direction.

In another embodiment, the relative position maintaining element includes angular teeth or regions that redistribute the force at the time of bending at least one coupling lightguide or maintains an even redistribution of force after at least one coupling lightguide is bent or folded. In another embodiment, the relative position maintaining element redistributes the force from bending and pulling one or more coupling lightguides from a corner point to substantially the length of an angled guide. In another embodiment, the edge of the angled guide is rounded.

In another embodiment, the relative position maintaining element redistributes the force from bending during the bending operation and provides the resistance to maintain the force required to maintain a low profile (short dimension in the thickness direction) of the coupling lightguides. In one embodiment, the relative position maintaining element includes a low contact area region, material, or surface relief regions operating as a low contact area cover, or region wherein one or more surface relief features are in physical contact with the region of the lightguide during the folding operation and/or in use of the light emitting device. In one embodiment, the low contact area surface relief features on the relative position maintaining element reduce decoupling of light from the coupling lightguides, lightguide, light mixing region, lightguide region, or light emitting region.

In a further embodiment, the relative position maintaining element is also a thermal transfer element. In one embodiment, the relative position maintaining element is an aluminum component with angled guides or teeth that is thermally coupled to an LED light source.

In another embodiment, a method of manufacturing a lightguide and light input coupler including a light transmitting film with a lightguide region continuously coupled to each coupling lightguide in an array of coupling lightguides where the array of coupling lightguides include a first linear fold region and a second linear fold region substantially parallel to the first fold region, includes the steps: (a) forming an array of coupling lightguides physically coupled to a lightguide region in a light transmitting film by physically separating at least two regions of a light transmitting film in a first direction; (b) increasing the distance between the first linear fold region and the second linear fold region of the array of coupling lightguides in a direction perpendicular to the light transmitting film surface at the first linear fold region; (c) decreasing the distance between the first linear fold region and the second linear fold region of the array of coupling lightguides in a direction substantially perpendicular to the first linear fold region and parallel to the light transmitting film surface at the first linear fold region; (d) increasing the distance between the first linear fold region and the second linear fold region of the array of coupling lightguides in a direction substantially parallel to the first linear fold region and parallel to the light transmitting film surface at the first linear fold region; and (e) decreasing the distance between the first linear fold region and the second linear fold region of the array of coupling lightguides in a direction perpendicular to the light transmitting film surface at the first linear fold region; such that the coupling lightguides are bent, disposed substantially one above another, and aligned substantially parallel to each other.

In one embodiment, the RPME includes alignment guides such as holes, ridges, openings, teeth, protrusions, or connectors, on one, two, three, or four sides of the RPME. For example, in one embodiment, the RPME is longer in a first direction than a second orthogonal direction and includes one or more alignment holes near the two ends in the longer direction. In one embodiment, one or more alignment guides is positioned on the side of the RPME opposite the teeth in the second orthogonal direction.

Perforated Areas

In one embodiment, the light emitting device includes one or more functional layers selected from the group: the film-based lightguide; cladding layer of the film based lightguide; touchscreen layer or substrate; hardcoating layer or substrate; anti-glare layer or substrate; color filter layer or substrate; electro-optic layer or substrate; reflective material, film, layer, or substrate; polarizer layer or substrate; light redirecting layer or substrate; light extraction feature film, layer or substrate; impact protection layer or substrate; internal coating or layer; conformal coating or layer; circuit board or layer; thermally conducting film, layer or substrate; sealant layer or substrate; spacer layer or substrate; electrically conducting layer (transparent or opaque) or substrate; anode layer or substrate; cathode layer or substrate; active matrix layer or substrate; and passive matrix layer or substrate. In one embodiment, at least one functional layer is perforated to allow for tearing of the functional layer or substrate before, during, or after assembly, forming the coupling lightguides, folding the coupling lightguides, stacking the ends of the coupling lightguides, or adhering the lightguide to a display.

Folding and Assembly

In one embodiment, the coupling lightguides are heated to soften the lightguides during the folding or bending step. In another embodiment, the coupling lightguides are folded while they are at a temperature above one selected from the group: 50 degrees Celsius, 70 degrees Celsius, 100 degrees Celsius, 150 degrees Celsius, 200 degrees Celsius, and 250 degrees Celsius.

Folder

In one embodiment, the coupling lightguides are folded or bent using opposing folding mechanisms. In another embodiment, grooves, guides, pins, or other counterparts facilitate the bringing together opposing folding mechanisms such that the folds or bends in the coupling lightguides are correctly folded. In another embodiment, registration guides, grooves, pins or other counterparts are disposed on the folder to hold in place or guide one or more coupling lightguides or the lightguide during the folding step.

Assembly Order

In one embodiment, the film-based lightguide includes an array of coupling lightguides and the array of coupling lightguides are folded prior to physically or optically coupling the film-based lightguide to the light emitting device, display or a component thereof. In another embodiment, the array of coupling lightguides are folded after physically or optically coupling the film-based lightguide to the light emitting device, display or a component thereof. In another embodiment, the light emitting device or display includes a light input coupler including a folded, stacked array of coupling lightguides and the light input coupler is assembled before or after the film-based lightguide is laminated to the display. In one embodiment, the display functions as a relative position maintaining element and adhering the film-based lightguide to the display maintains the relative position of the coupling lightguides during the subsequent folding operation.

Guide for Bend or Fold

In one embodiment, a lightguide or light emitting device comprises a guide for one or more bends or folds. In this embodiment, the guide is an element with at least one curved surface adjacent a curved inner surface of the film at the bend. In one embodiment, the guide limits the radius of curvature of the bend or fold such that the film does not crease, tear, craze, or crack in the fold or bend region. In one embodiment, the curved surface of the guide is in contact with the inner surface of the film and when tension is applied to the film (such as when a film is pulled behind itself), the guide surface ensures a minimum radius of curvature for the film. In one embodiment, the guide can help protect against crushing, creasing, or wrinkling of the film during handling, device assembly, or during the folding or bending step. In one embodiment, a lightguide comprises a film with a light emitting region and an array of coupling lightguides extending from a body of the film and the film is folded behind itself at a first fold; and a guide comprising a first curved surface adjacent an inner surface of the film at the first fold. In one embodiment, a lightguide comprises a film with a light mixing region disposed along the film between the light emitting region and an array of coupling lightguides extending from the film, the light mixing region is folded at a first fold such that a portion of the light mixing region is behind the light emitting region; and a first guide with a first curved surface adjacent an inner surface of the light mixing region of the film. In another embodiment, the light emitting region of the film folds behind itself at a first fold and the guide is positioned adjacent the light emitting region at the fold.

The guide may be formed from a metal, polymer, plastic, rubber, foam rubber, glass, inorganic material, organic material, or a combination thereof. In one embodiment, the guide is a component located within the fold or bend of the film and may be free-standing, physically coupled, operatively coupled, or mechanically coupled to a component of the device. The guide may be solid or hollow. In one embodiment the guide is a surface of a device element such as the film, display, display substrate, glass substrate, glass substrate of a display, display frame, backlight frame, frontlight frame, light fixture frame, display lens or cover, display module, housing, housing for the light input coupler, frame, circuit board, electrical or mechanical connector, a hinge, a gasket, connector, relative position maintaining element, component of the light emitting device, thermal transfer element (such as a heat sink), or rolled-up portion of the film (such as a light mixing region wrapped around the coupling lightguides to form a shape with a curved surface that is used for the guide). In another embodiment, the guide is a separate component comprising a curved surface adjacent the inner surface of the film at the fold or bend wherein the guide is operatively coupled, physically coupled, adhered, or glued to one or more components selected from the group: film, display, display substrate, glass substrate, glass substrate of a display, display frame, backlight frame, frontlight frame, light fixture frame, display lens or cover, display module, housing, housing for the light input coupler, frame, circuit board, electrical or mechanical connector, a hinge, a gasket, connector, relative position maintaining element, thermal transfer element, component of the light emitting device, and an intermediate component operatively coupled to one or more of the aforementioned components.

Guide Surface

In one embodiment, the surface of the guide adjacent the inner surface of the film at the fold or bend is curved in a first plane comprising the fold or bend of the film. In one embodiment, the curved surface of the guide or a portion of the curved surface of the guide adjacent the inner surface of the film at the fold or bend in a plane comprising the fold or bend of the film comprises a subtended angle from a point at the midpoint of the line between a point on the inner surface of the film at the start of the fold or bend and the point on the inner surface of the film at the end of the fold or bend, and the subtended angle is one or more selected from the group: greater than 45 degrees, greater than 80 degrees, 90 degrees, greater than 90 degrees, greater than 135 degrees, 180 degrees, greater than 180 degrees, greater than 270 degrees, between 45 degrees and 360 degrees, between 80 degrees and 360 degrees, between 80 degrees and 270 degrees.

In one embodiment, the cross-sectional shape of the surface of the guide adjacent the inner surface of the film in the fold or bend region comprises all, a portion, or a combination of a circle, semicircle, oval, ellipse, parabola, or hyperbola.

In one embodiment, the curved surface of the guide or a portion of the curved surface of the guide adjacent the inner surface of the film at the fold or bend in a plane comprising the fold or bend of the film has a radius of curvatures or average radius of curvature less than one selected from the group: 1, 2, 4, 8, 10, 20, 30, 50, 100, 200 and 400 millimeters. In embodiments where the radius of curvature of the surface of the guide is not uniform, the average radius of curvature is the average radius of curvature of the surface in the region of the surface of the guide adjacent the inner surface of the film. In another embodiment the curved surface of the guide or the portion of the curved surface of the guide adjacent the inner surface of the film at the fold or bend has a radius of curvatures or average radius of curvature greater than one selected from the group: 1, 2, 4, 8, 10, 20, 30, 50, 100, 200 and 400 millimeters. In this embodiment, the guide can maintain the minimum radius of curvature for the film at the fold to 4 millimeters, for example.

In one embodiment, the curved surface of the guide or a portion of the curved surface of the guide adjacent the inner surface of the film at the fold or bend in a plane comprising the fold or bend of the film has a radius of curvatures or average radius of curvature less than one selected from the group: 2, 4, 8, 10, 20, 30, and 50 times the average thickness of the film at the fold or bend. In another embodiment the curved surface of the guide or the portion of the curved surface of the guide adjacent the inner surface of the film at the fold or bend has a radius of curvatures or average radius of curvature greater than one selected from the group: 0.5, 1, 2, 3, 4, 8, 10, 20, and 30 times the average thickness of the film at the fold or bend. In this embodiment, the guide can maintain the minimum radius of curvature for the film at the fold to greater than 2 times the average thickness of the film at the fold or bend, for example.

In one embodiment, a reflective display comprises reflective spatial light modulator (SLM), a frontlight comprising a film with a light emitting region positioned adjacent a top surface of the reflective SLM on the viewing side of the reflective SLM and configured to extract light toward the reflective SLM, wherein the film is folded behind and adjacent a bottom surface of the reflective SLM at a first fold and the ratio of the radius of curvature or average radius of curvature of a surface of the guide adjacent the inner surface of the film at the fold in a plane comprising the fold to the thickness of the reflective SLM from the top surface to the bottom surface in a plane comprising the fold is greater than one selected from the group: 0.5, 0.75, 1, 1.25, 1.5, 1.75, 2, 2.5, 3, 3.5, 4, 4.5, 5, 6, 7, 8, 9, and 10.

In one embodiment, the inner surface of the film is in contact with the outer surface of the guide at the fold or bend and, in a plane comprising the fold or bend, the radius of curvature or average radius of curvature of the film at the fold or bend along the inner film surface in contact with the outer surface of the guide is substantially the same as the radius of curvature or average radius of curvature of the outer guide surface in contact with the inner surface of the film at the fold or bend.

In one embodiment, the surface of the guide adjacent the film at the fold or bend is smooth, rough, comprises surface undulations, surface grooves, surface pits, or raised surface relief structures. In one embodiment, the non-smooth surface reduces the surface area of the guide in contact with the film and can reduce the friction when the film is pulled or folded behind itself while maintaining a minimum radius of curvature for the fold or bend.

In one embodiment, the cross-section of the guide at the surface of the guide adjacent the inner surface of the film at the fold or bend in a plane comprising the fold or bend is substantially constant in a direction perpendicular to the plane comprising the fold or bend. For example, in one embodiment, the guide has a shape of substantially half of a rod with a semicircular cross-section, with a length more than three times it's width in a plane comprising the fold of the film, and a surface adjacent the inner surface of the film with a cross-section comprising an arc subtending a 180 degrees in the plane comprising the fold.

Frame

In one embodiment, one or more relative position maintaining elements are operatively coupled to a frame. In one embodiment, the frame includes a perimeter region and an interior opening. The interior opening can reduce the weight and material costs of the frame, relative to a sheet, for example. In one embodiment, the frame is thermally coupled to a light source such that the frame transfers heat away from the light source through conduction. For example, in one embodiment, the light source is an LED and is thermally coupled to a metal core circuit board that is thermally coupled to the frame. In another embodiment, a light emitting device includes a film-based lightguide that is operatively coupled to the frame. For example, in one embodiment, the film-based lightguide is adhered along one or more sides of a frame. In another embodiment, the length and width of the frame are greater than 5 times the average thickness of the frame. In another embodiment, the frame has a top surface opposite the bottom surface in the thickness direction and the film-based lightguide is operatively coupled to the frame on the top surface, the bottom surface, or both the top and bottom surfaces. In another embodiment, the film-based lightguide is operatively coupled to the top surface and the bottom surface of the frame along the same surface of the lightguide. In one embodiment, the film is operatively coupled to the frame through an intermediate material or component, such as film, optical film, reflective film, frame clamp, fastener, adhesive, housing or housing component, or other element of the light emitting device. In another embodiment, the lightguide is operatively coupled to the frame such that the frame prevents the lightguide from unfolding due to residual stress remaining in the lightguide. In another embodiment, the frame includes one or more curved surfaces or edges along one or more sides to increase the contact surface of the frame with the film-based lightguide and reduce the likelihood of a tear. In one embodiment, a frame includes a curved region with a radius of curvature less than one selected from the group: 1, 2, 4, 8, 10, 20, 30, 50, 100, 200 and 400 millimeters. In one embodiment, the width and/or the length dimension of the frame is greater than the corresponding length or width dimension of the light emitting area of the film-based lightguide. In another embodiment, the width and/or the length of the frame is equal to the corresponding length or width dimension of the light emitting area of the film-based lightguide. In one embodiment, the width and/or the length dimension of the frame is less than the corresponding length or width dimension of the light emitting area of the film-based lightguide. In another embodiment, the width and/or the length dimension of the frame is less than the corresponding length or width dimension of the light emitting area of the film-based lightguide corresponding to the area illuminating a display. In another embodiment, the length or width dimension of the relative position maintaining element is less than the distance between two attachment mechanisms operatively configured to couple to the relative position maintaining element along opposite sides of the frame.

Attachment Mechanisms for Securing Components to the Frame

In one embodiment, the frame includes a plurality of attachment mechanisms on one or more sides or internal regions that facilitate the coupling of the frame to one or more components selected from the group: one or more relative position maintaining elements, one or more light sources, one or more printed circuit boards, a housing, one or more films, one or more optical films, one or more reflective films, one or more film-based lightguides, one or more reflective displays, one or more transmissive displays, one or more transflective displays, a flexible electrical connector, one or more heat sinks, one or more thermal conducting elements, one or more optical elements, one or more batteries, one or more touch sensors (including switches or capacitive touch sensors), a touch screen, and a ground connector. In one embodiment, the attachment mechanism includes one or more fasteners selected from the group: holes, cavities, recessed regions, protrusions, pins, threaded fasteners, screws, bolts, nuts, screw holes, fixed or bendable tabs operatively configured to attach components, adhesive, clamps, clasps, flanges, latches, retainers, rivets, and stitches.

In one embodiment, the frame includes a plurality of attachment mechanisms that facilitate the coupling of the relative position maintaining element to the frame. For example, in one embodiment, the attachment mechanisms are tabs including one or more holes or protrusions. In this example, protrusions in the relative position maintaining element may operatively couple with holes in the tabs or holes in the relative position maintaining element may operatively couple with pins in the tabs on opposite sides of a frame. In one embodiment, attachment mechanisms on the frame are inset from the outer edges of the frame such that the corresponding attachment mechanisms on the component to which it is attached do not extend past the outer edges of the frame along one or more sides. For example, in one embodiment, an aluminum frame includes two attachment tabs on opposite sides in the width direction. In this embodiment, the frame tabs are set inwards from outer edge of the frame, by 3 millimeters for example, such that the pins protruding from opposite ends of a relative position maintaining element, protruding by 3 millimeters for example, do not extend past the edge of the frame when they are engaged into holes in the frame tabs. In another embodiment, a frame for a light emitting device includes one or more tabs configurable to operatively couple a relative position maintaining element to the frame wherein the tabs have an inset distance from the closest length or width edge of the frame greater than one selected from the group: 1, 2, 4, 8, 10, 20, 30, 50, 100, 200 and 400 millimeters.

In this embodiment, the width of the frame can be less than or equal to the width of the light emitting area of the light emitting device or display to enable a minimal frame (or border or bezel) around the light emitting area of the light emitting device or display. In another embodiment, the relative position maintaining element or housing including the relative position maintaining element or light source includes a recessed cavity or notch into which tabs on a frame can be inserted. For example, in one embodiment, tabs on an aluminum frame are inserted into an opening in a relative position maintaining element (or housing or other element operatively coupled to the relative position maintaining element) such that a mechanical force, such as from a spring or a restoring force from the elastic modulus in the tabs when inserted into the opening, forces contact between the tabs and a thermal conducting element. In this embodiment, the thermal conducting element is thermally coupled to a light emitting diode such that a conductive heat path is created between the light source and the frame. In another embodiment, the thermal conducting element includes one or more selected from the group: heat sink, metal core circuit board, thermally conductive adhesive or epoxy, thermally conductive pad, thermally conductive grease or gel, solder, component including copper, component including aluminum, component including a ceramic material, metal component, heat sink, and heat pipe. In one embodiment, the frame is a heat sink for the light source and is thermally coupled to the light source using a thermally conductive element. For example, in one embodiment, one or more LEDs are thermally coupled to an aluminum frame (such by thermally coupling to the frame through the frame's attachment mechanisms or directly thermally coupled to the frame) using a thermally conductive adhesive.

In another embodiment, the frame includes one or more attachment mechanisms in an interior region of the frame that is continuous with more than one side of the frame. For example, in one embodiment, the frame includes an opening that only extends across half of the length of the frame and the frame includes attachment one or more attachment mechanisms in the interior region outside the opening.

In one embodiment, the frame includes one or more tabs that are bent or include a curve or turn that operatively couples one or more optical films to the frame. For example, in one embodiment, an aluminum frame includes bent tabs (or regions with an angled or curved surface) creating openings along two sides and bendable tabs along opposite sides that enable optical films to be positioned on the frame, into the openings, and operatively coupled to the frame after bending the bendable tabs. In another embodiment, the frame includes one or more registration pins positioned outside the region corresponding to the light emitting area of the film-based lightguide when it is operatively coupled to the frame. For example, in one embodiment, a frame includes registration pins extending from the top surface of the frame along its periphery and one or more optical films include holes (or grooves that allow for film thermal expansion) that align with the pins when the films are operatively coupled to the frame.

In another embodiment, the frame includes two or more components, such as a top section and a bottom section that can be operatively coupled to each other. For example, in one embodiment, a frame includes a bottom section operatively coupled to a relative position maintaining element and a top section. In this embodiment, one or more optical films and/or lightguides can be operatively coupled to the top section of the frame and when the top section is operatively coupled to the bottom section the frame, the frame operatively couples one or more optical films and/or lightguides to the relative position maintaining element.

In one embodiment, the one or more pairs of tabs on opposite sides of a frame (along the width direction, for example) operatively couple a relative position maintaining element to a frame and are positioned on the frame such that a line between the tabs is not parallel with the edge of the frame joining the two sides (the length edge, for example). In this embodiment, the relative position maintaining element is not parallel to one or more sides of the frame.

In one embodiment, the frame includes at least one support arm extending from a frame side into the interior region or opening of the frame or outward from the interior region of the frame. In one embodiment, the support arm extends into the interior region of the frame and includes one or more tabs operatively coupled to one or more relative position maintaining elements. In one embodiment, the length of the support arm is less than the length of the opening in one direction. In another embodiment, the support arm extends across the length of the opening in one direction and is operatively coupled to two sides of the frame.

The following are more detailed descriptions of various embodiments illustrated in the Figures.

FIG. 1 is a top view of one embodiment of a light emitting device 100 including a light input coupler 101 disposed on one side of a film-based lightguide. The light input coupler 101 includes coupling lightguides 104 and a light source 102 disposed to direct light into the coupling lightguides 104 through a light input surface 103 including input edges of the coupling lightguides 104. In one embodiment, each coupling lightguide 104 includes a coupling lightguide terminating at a bounding edge. Each coupling lightguide is folded such that the bounding edges of the coupling lightguides are stacked to form the light input surface 103. The light emitting device 100 further includes a lightguide region 106 defining a light mixing region 105, a lightguide 107, and a light emitting region 108. Light from the light source 102 exits the light input coupler 101 and enters the lightguide region 106 of the film. This light spatially mixes with light from different coupling lightguides 104 within the light mixing region 105 as the light propagates through the lightguide 107. In one embodiment, light is emitted from the lightguide 107 in the light emitting region 108 due to light extraction features (not shown). In this embodiment, the light mixing region 105 includes a tapered lateral edge 111 that tapers outward from the coupling lightguides 104 to the light emitting region 108. In this embodiment, the tapered edge 111 has an extended direction length 110 and a displacement 109 from the lateral edge 112 of the lightguide 107 in the light emitting region 108. When the light input coupler 101 and at least a portion of the light mixing region 105 of the lightguide 107 are folded behind the light emitting region 108 of the lightguide 107, the light source 102 does not extend past the lateral edge 112 of the lightguide 107 in the light emitting region 108.

Figure 2:
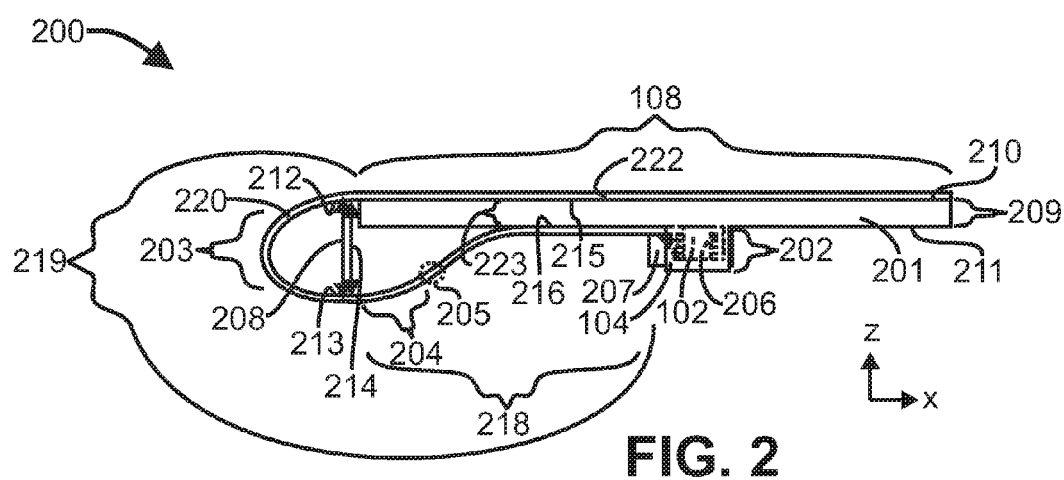
FIG. 2 is a side view of one embodiment of a light emitting device including a film-based lightguide operatively coupled to a frame.
Figure 3:
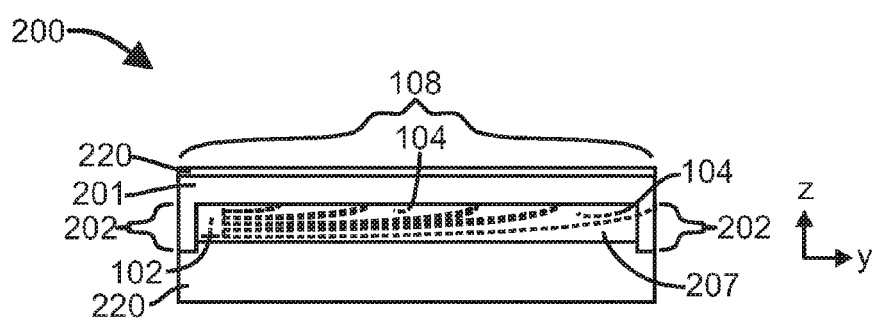
FIG. 3 is a side view of the light emitting device of FIG. 2 illustrating the relative position maintaining element between the two tabs of the frame.

FIGS. 2 and 3 are side views of one embodiment of a light emitting device 200 including a film-based lightguide 220 operatively coupled to a frame 201. In FIGS. 2 and 3 dotted lines are used to reference components behind other components. A plurality of coupling lightguides 104 extend from the lightguide 220 and are folded and stacked such that their ends 206 are positioned to receive light from the light source 102. A relative position maintaining element 207 substantially maintains the relative position of the coupling lightguides 104. The relative position maintaining element 207 is physically coupled to two tabs 202 of the frame 201. The lightguide 220 includes a taper (not shown) in the light mixing region 219 between the coupling lightguides 104 and the light emitting region 108 that permits the light source 102 and the relative position maintaining element 207 to remain between the tabs 202 of the frame 201 and not extend past the lateral edges 222 of the lightguide 220 in the light emitting region 108 in the y direction. In this embodiment, the frame 201 does not extend past the light emitting region 108 of the lightguide 220 in the y direction (shown in FIG. 3). The lightguide 220 includes a first bend 203 in the light mixing region 219 to position the light source 102 and the coupling lightguides 104 behind the light emitting region 108 and a second bend 204 in the light mixing region 219 to position the light source 102 and at least one coupling lightguide 104 at a distance 209 from the light emitting region 108 of the lightguide 220 in the z direction less than the diameter 208 of the first bend 203. In this embodiment, the lightguide 220 is operatively coupled to the frame 201 on the top surface 210 and bottom surface 211 of the frame 201 and the maximum separation distance 214 between inner surface regions 212, 213 of the folded lightguide 220 is greater than the average separation distance 223 between the lower surface 215 of the light emitting region 108 of the lightguide 220 and the upper surface 216 of the portion 218 of the light mixing region 219 positioned below the light emitting region 108 (in the −z direction). The shape of the lightguide 220 further includes an inflection point 205 in the plane (x-z plane) including the first bend 203.

FIG. 3 is a side view of the light emitting device 200 of FIG. 2 illustrating the relative position maintaining element 207 between the two tabs 202 of the frame 201. In this embodiment, the light source 102 is thermally coupled to the frame 201 to transfer heat through the frame 201 and away from the light source 102 (such as an LED, for example).

Figure 4:
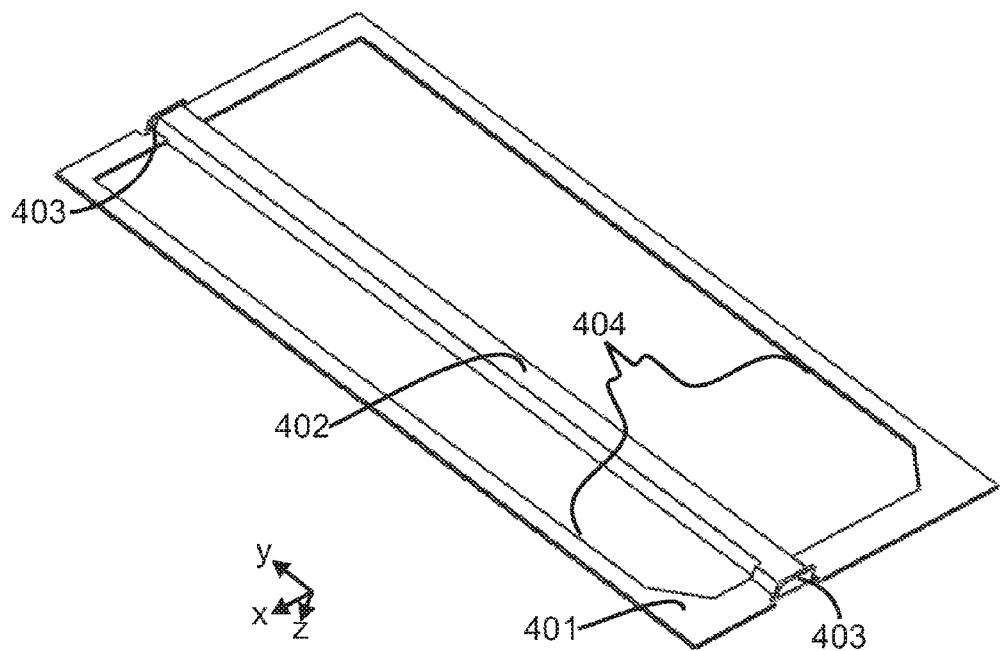
FIG. 4 is a bottom perspective view of one embodiment of a frame and a relative position maintaining element suitable for use in an embodiment of a light emitting device.

FIG. 4 is a bottom perspective view of one embodiment of a frame 401 and a relative position maintaining element 402 suitable for use in an embodiment of a light emitting device. The relative position maintaining element 402 is operatively coupled to the frame 401 using two tabs 403 of the frame 401 on opposite sides of the frame 401. The frame 401 further includes an opening 404 to reduce the weight of the frame 401 while maintaining structural integrity.

Figure 5:
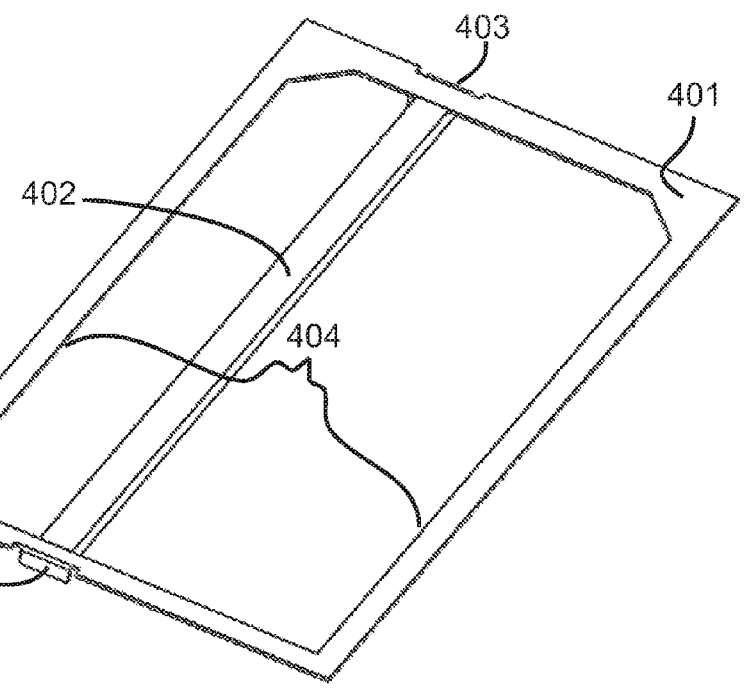
FIG. 5 is a top perspective view of the frame of FIG. 4.

FIG. 5 is a top perspective view of the frame 401 of FIG. 4.

Figure 6:
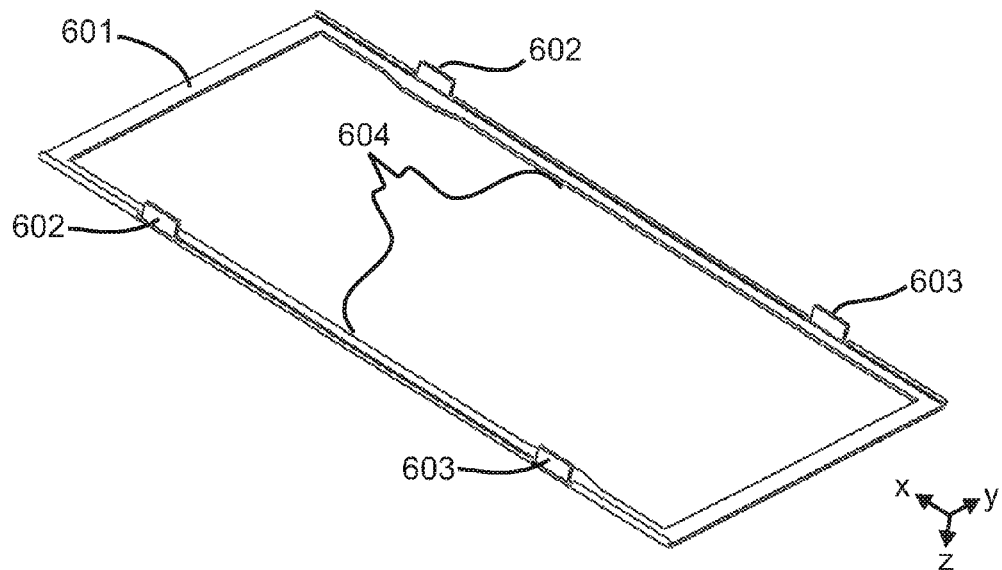
FIG. 6 is a perspective view of one embodiment of a frame including openings suitable for use in a light emitting device.

FIG. 6 is a perspective view of one embodiment of a frame 601 suitable for use in a light emitting device. The frame 601 includes first tabs 602 on opposite sides of the frame 601 and second tabs 603 on opposite sides of the frame 603. The frame 601 further includes an opening 604 to reduce the weight of the frame 601 while maintaining structural integrity.

Figure 7:
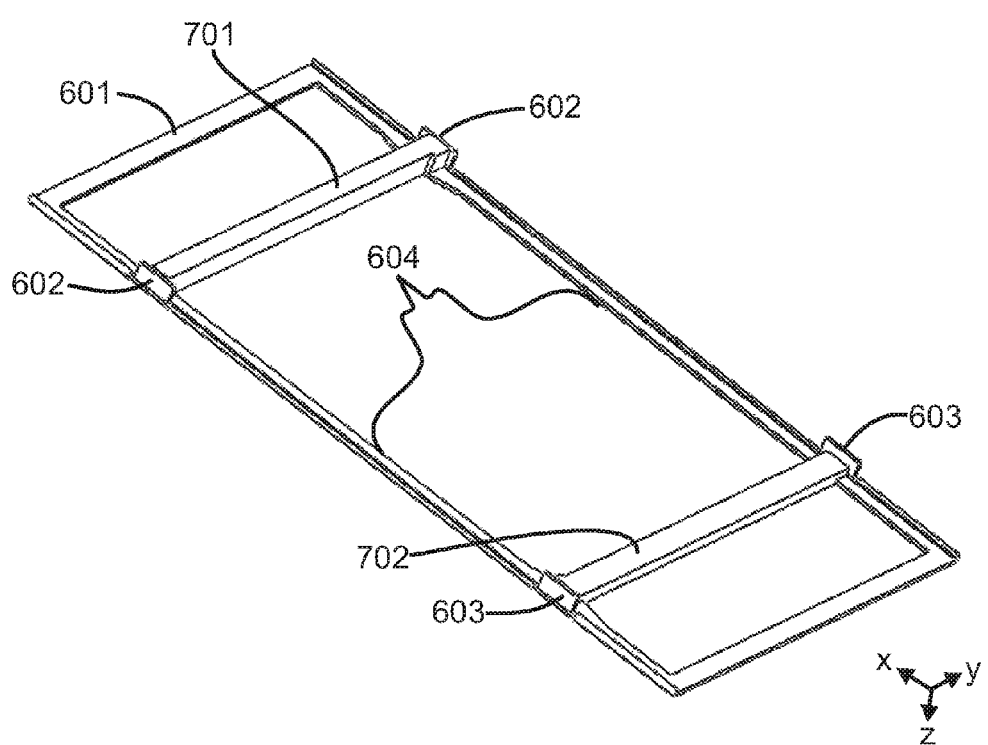
FIG. 7 is a perspective view of the frame of FIG. 6, a first relative position maintaining element, and a second relative position maintaining element.

FIG. 7 is a perspective view of the frame 601 of FIG. 6, a first relative position maintaining element 701, and a second relative position maintaining element 702. The first relative position maintaining element 701 is operatively coupled to the first tabs 602. The first relative position maintaining element 702 is operatively coupled to the second tabs 603. In this embodiment, for example, the frame 601 can be utilized in a light emitting device with two light input couplers for coupling light into two sides of a single lightguide or into two or more lightguides.

Figure 8:
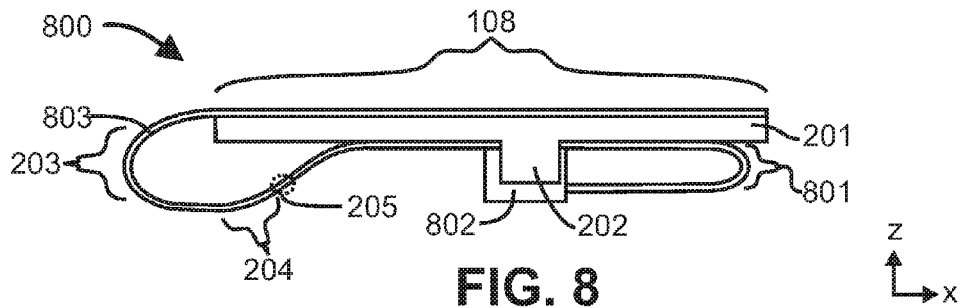
FIG. 8 is a side view of one embodiment of a light emitting device including a film-based lightguide including a plurality of bends operatively coupled to a frame.

FIG. 8 is a side view of one embodiment of a light emitting device 800 including a film-based lightguide 803 operatively coupled to a frame 201. In this embodiment, the housing 802 includes a relative position maintaining element (not shown), a plurality of coupling lightguides (not shown), and a light source (not shown). The housing 802 is physically coupled to two tabs 202 of the frame 201. The film-based lightguide 803 includes a first bend 203 in the light mixing region 904 (shown in FIG. 9) of the lightguide 803 between the light emitting region 108 and the housing 802 that positions the housing 802 and its components behind the light emitting region 108 and a second bend 204 in the light mixing region 219 that positions the housing 802 and its components closer to the light emitting region 108 of the lightguide 803 in the z direction. In this embodiment, the lightguide 803 further includes a third bend 801 in the light mixing region 904 of the lightguide 803 to accommodate the long length of the lightguide 803 (in the x-z plane including the first bend 203, the second bend 204, and the third bend 801). In this example, the ratio of the length of the light mixing region 904 to the length of the light emitting region 108 in the x-z plane is greater than 1.

Figure 9:
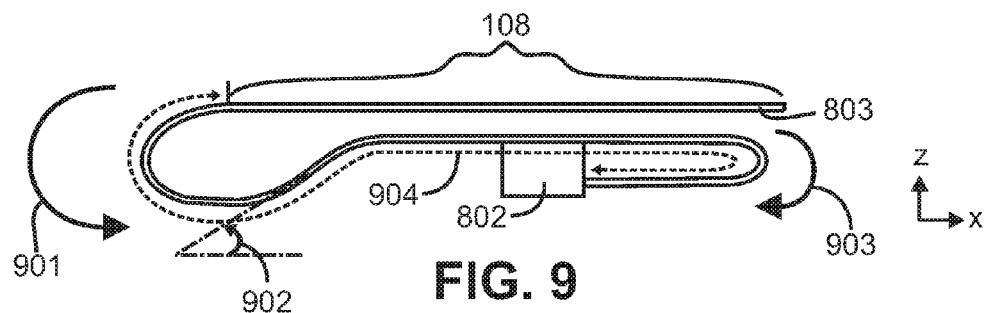
FIG. 9 is side view of the lightguide including the light emitting region, the light mixing region and the relative position maintaining element of FIG. 8.

FIG. 9 is side view of the lightguide 803 including the light emitting region 108, the light mixing region 904 and the relative position maintaining element 802 of FIG. 8. The light mixing region 904 is represented by a dashed line corresponding to the length of the lightguide 803 between the light emitting region 108 and the relative position maintaining element 802 in the x-z plane. In this embodiment, the first bend angle 901 is 180 degrees, the second bend angle 902 is 45 degrees, and the third bend angle 903 is 180 degrees.

Figure 10:
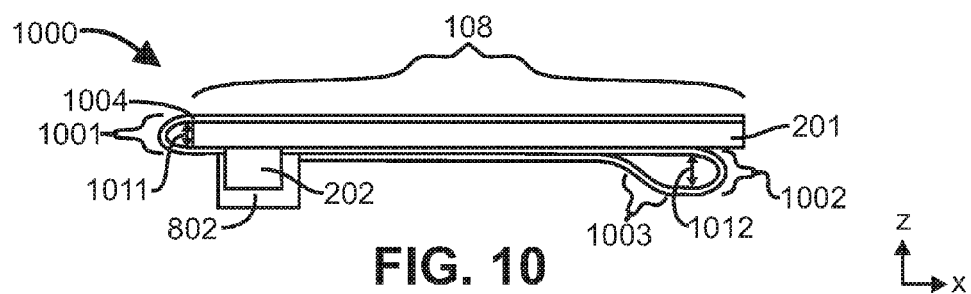
FIG. 10 is a side view of one embodiment of a light emitting device including a film-based lightguide including two bends operatively coupled to a frame.

FIG. 10 is a side view of one embodiment of a light emitting device 1000 including a film-based lightguide 1004 operatively coupled to a frame 201. In this embodiment, the housing 802 includes a relative position maintaining element (not shown), a plurality of coupling lightguides (not shown), and a light source (not shown). The housing 802 is operatively coupled to two tabs 202 of the frame 201. The film-based lightguide 1004 includes a first bend 1001 with a first bend angle of 180 degrees in the light mixing region of the lightguide 1004 between the light emitting region 108 and the housing 802. In this embodiment, the first bend 1001 positions the housing 802 behind the light emitting region 108 and closer to the light emitting region 108 of the lightguide 1004 in the z direction. In this embodiment, the lightguide 803 further includes a second bend 1002 and a third bend 1003 in the light mixing region of the lightguide 1004 to accommodate the long length of the lightguide 1004 (in the x-z plane including the first bend 1001, the second bend 1002, and the third bend 1003). In this example, the ratio of the length of the light mixing region to the length of the light emitting region 108 in the x-z plane is greater than 2 and the lightguide 1004 is folded behind itself twice due to the first bend 1001 and the second bend 1002. The housing 802 is positioned closer to the light emitting region 108 of the lightguide 1004 than the sum of the first diameter 1011 of the first bend 1001 and the second diameter 1012 of the second bend 1002.

Figure 11:
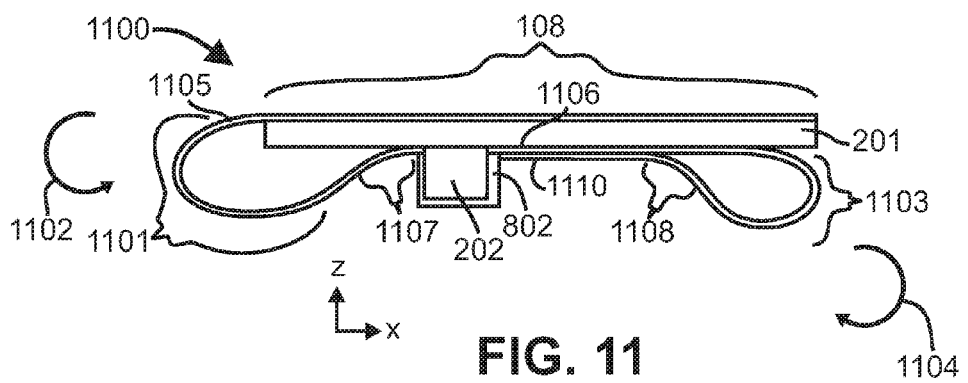
FIG. 11 is a side view of one embodiment of a light emitting device including a film-based lightguide with 3 bends operatively coupled to a frame.

FIG. 11 is a side view of one embodiment of a light emitting device 1100 including a film-based lightguide 1105 operatively coupled to a frame 201. In this embodiment, the housing 802 includes a relative position maintaining element (not shown), a plurality of coupling lightguides (not shown), and a light source (not shown). The housing 802 is physically coupled to two tabs 202 of the frame 201. The film-based lightguide 1105 includes a first bend 1101 with a first bend angle 1102 of 225 degrees in the light mixing region of the lightguide 1105 between the light emitting region 108 and the housing 802 that folds a second region 1106 of the lightguide 1105 behind or beneath and closer to the light emitting region 108 of the lightguide 1105 in the z direction. In this embodiment, the lightguide 1105 further includes a second bend 1103 with a second bend angle 1104 of 225 degrees in the light mixing region of the lightguide 1105 to fold the lightguide 1105 behind or beneath and closer to the second region 1106 of the lightguide 1105 and the light emitting region 108 of the lightguide 1105 in the z direction. In this embodiment, the first bend 1101 and the second bend 1103 are in the same plane (the x-z plane) and in the light mixing region of the lightguide 1105 between the light emitting region 108 and the housing 802. In this embodiment, the lightguide 1105 includes a third bend 1107 and a fourth bend 1108 that bend the lightguide 1105 to bring it substantially parallel with another region of the lightguide 1105 (such as the light emitting region 108) or component of the light emitting device 1100, such as the frame 201. In the embodiment shown, the third bend 1107 bends the lightguide 1105 such that the second region 1106 of the lightguide 1105 is parallel to the light emitting region 108 of the lightguide 1105. The fourth bend 1108 bends the lightguide 1105 such that the third region 1110 of the lightguide 1105 between the housing 802 and the second bend 1103 is parallel to the light emitting region 108 of the lightguide 1105.

Figure 12:
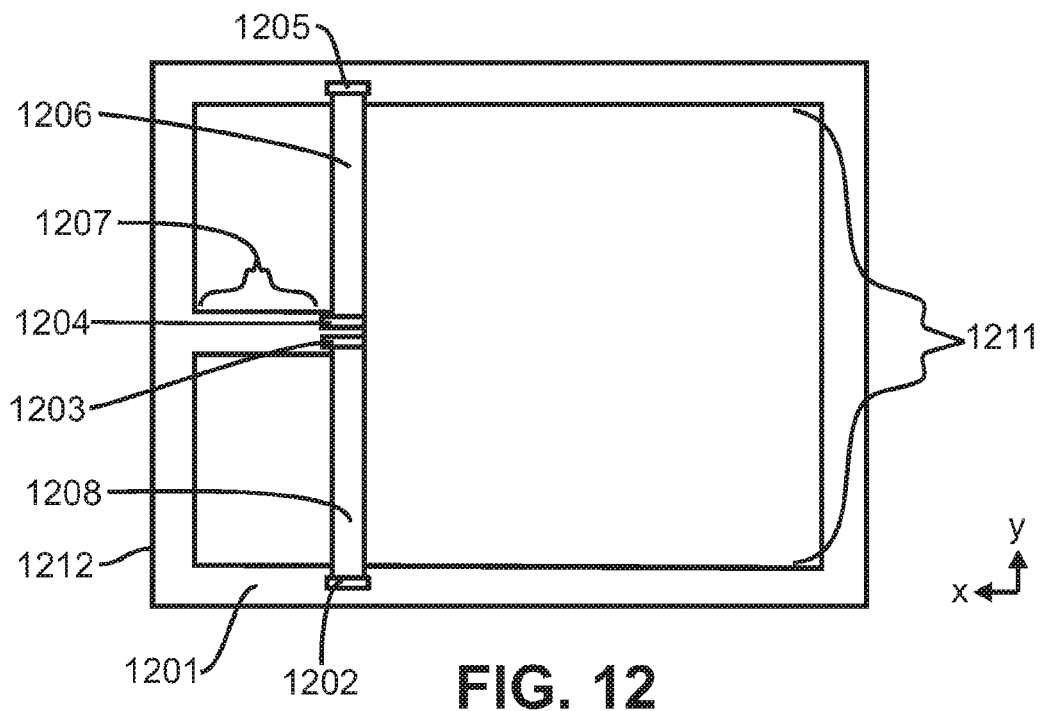
FIG. 12 is a bottom view of one embodiment of a frame, a first relative position maintaining element, and a second relative position maintaining element suitable for use in an embodiment of a light emitting device.

FIG. 12 is a bottom view of one embodiment of a frame 1201, a first relative position maintaining element 1206, and a second relative position maintaining element 1208 suitable for use in an embodiment of a light emitting device. The first relative position maintaining element 1206 is operatively coupled to the frame 1201 using a first tab 1204 and a second tab 1205 of the frame 1201 wherein the first tab 1204 extends from a support arm 1207 of the frame 1201 extending into the opening 1211 of the frame 1201. The second relative position maintaining element 1208 is operatively coupled to the frame 1201 using a third tab 1203 and a fourth tab 1202 of the frame 1201 wherein the third tab 1203 extends from the support arm 1207 of the frame 1201 extending into the opening 1211 of the frame 1201. In this embodiment, the support arm 1207 permits two relative position maintaining elements 1206, 1208 to be used along a first side 1212 of the frame 1201 such that a film-based lightguide (not shown) wrapped around the frame 1201 can utilize two light input couplers (not shown) along the first side 1212 of the frame 1201.

Figure 13:
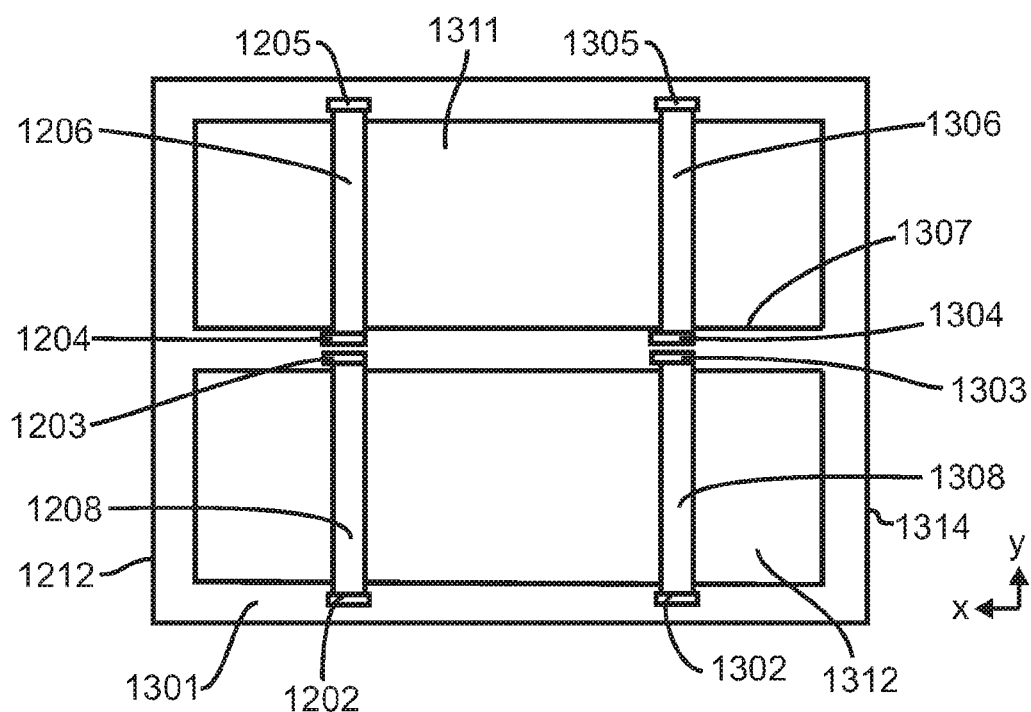
FIG. 13 is a bottom view of one embodiment of a frame, a first relative position maintaining element, a second relative position maintaining element, a third relative position maintaining element, and a fourth relative position maintaining element suitable for use in an embodiment of a light emitting device.

FIG. 13 is a bottom view of one embodiment of a frame 1301, a first relative position maintaining element 1206, a second relative position maintaining element 1208, a third relative position maintaining element 1306, and a fourth relative position maintaining element 1308 suitable for use in an embodiment of a light emitting device. In this embodiment, a support arm 1307 extends across the length (x direction) of the frame 1301 to create a first opening 1311 and a second opening 1312 within the interior of the frame 1301. The first relative position maintaining element 1206 is operatively coupled to the frame 1301 using a first tab 1204 and a second tab 1205 of the frame 1301 wherein the first tab 1204 extends from the support arm 1307 of the frame 1301. The second relative position maintaining element 1208 is operatively coupled to the frame 1301 using a third tab 1203 and fourth tab 1202 of the frame 1301 wherein the third tab 1203 extends from the support arm 1307 of the frame 1301. The third relative position maintaining element 1306 is operatively coupled to the frame 1301 using a fifth tab 1304 and a sixth tab 1305 of the frame 1301 wherein the fifth tab 1304 extends from the support arm 1307 of the frame 1301. The fourth relative position maintaining element 1308 is operatively coupled to the frame 1301 using a seventh tab 1303 and an eighth tab 1302 of the frame 1301 wherein the seventh tab 1303 extends from the support arm 1307 of the frame 1301. In this embodiment, the support arm 1307 permits two relative position maintaining elements 1206, 1208 to be used along a first side 1212 of the frame 1301 and two relative position maintaining elements 1306, 1308 to be used along a second side 1314 of the frame 1301 such that a film-based lightguide (not shown) wrapped around the frame 1301 on the first side 1212 and second side 1314 can utilize two light input couplers (not shown) along the first side 1212 of the frame 1301 and two light input couplers (not shown) along the second side 1314 of the frame 1301.

Figure 14:
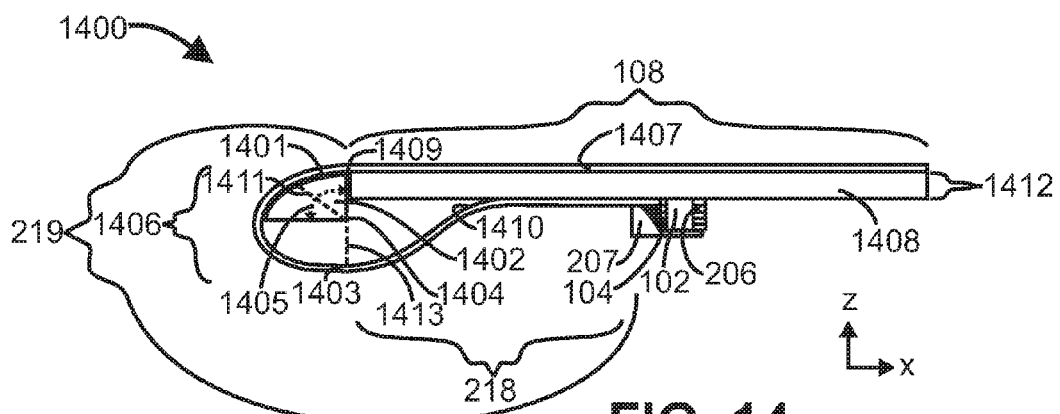
FIG. 14 is a side view of one embodiment of a reflective display with a film lightguide and a guide with a guide surface adjacent a surface of the film lightguide with an subtended angle of 90 degrees.

FIG. 14 is a side view of one embodiment of a reflective display 1400 including a film lightguide 1407 operatively coupled to a reflective spatial light modulator 1408. A plurality of coupling lightguides 104 extend from the film lightguide 1407 and are folded and stacked such that their ends 206 are positioned to receive light from the light source 102. A relative position maintaining element 207 substantially maintains the relative position of the coupling lightguides 104. The film lightguide 1407 includes a first bend 1406 in the light mixing region 219 such that a portion 218 of the light mixing region 219 is positioned behind the light emitting region 108 of the film lightguide 1407 and reflective spatial light modulator 1408. A guide 1402 is positioned within the first bend 1406 such that a first curved surface 1401 of the guide 1402 is adjacent the inner surface 1410 of the film lightguide 1407. In this embodiment, the curved surface 1401 of the guide 1402 adjacent the inner surface 1410 of the film lightguide 1407 at the bend 1406 in a plane (x-z plane as shown) comprising the bend 1406 of the film lightguide 1407 has a subtended angle 1405 from the midpoint 1404 of the line 1413 (shown dashed) between a point 1409 on the inner surface 1410 of the film lightguide 1407 at the start of the bend 1406 and the point 1403 on the inner surface 1410 of the film lightguide 1407 at the end of the bend 1406. In this embodiment, the subtended angle 1405 is 90 degrees and the radius of curvature 1411 of the surface 1401 of the guide 1402 adjacent the inner surface 1410 of the film lightguide 1407 in the plane (x-z plane) comprising the bend 1406 is greater than 1.5 times the thickness 1412 of the reflective spatial light modulator 1408.

Figure 15:
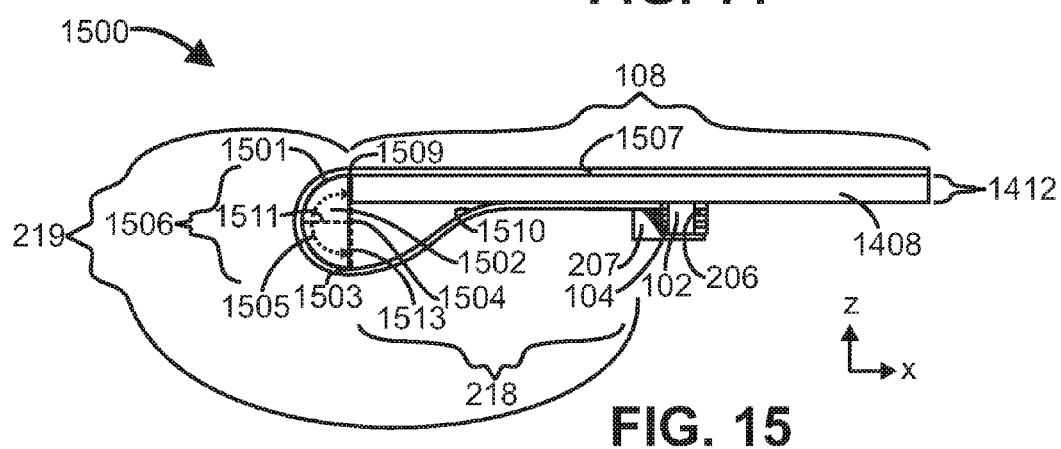
FIG. 15 is a side view of one embodiment of a reflective display with a film lightguide and a guide with a guide surface adjacent a surface of the film lightguide with an subtended angle of 180 degrees.

FIG. 15 is a side view of one embodiment of a reflective display 1500 including a film lightguide 1507 operatively coupled to a reflective spatial light modulator 1408. A plurality of coupling lightguides 104 extend from the film lightguide 1407 and are folded and stacked such that their ends 206 are positioned to receive light from the light source 102. A relative position maintaining element 207 substantially maintains the relative position of the coupling lightguides 104. The film lightguide 1507 includes a first bend 1506 in the light mixing region 219 such that a portion 218 of the light mixing region 219 is positioned behind the light emitting region 108 of the film lightguide 1507 and reflective spatial light modulator 1408. A guide 1502 is positioned within the first bend 1506 such that a first curved surface 1501 of the guide 1502 is adjacent the inner surface 1510 of the film lightguide 1507. In this embodiment, the curved surface 1501 of the guide 1502 adjacent the inner surface 1510 of the film lightguide 1507 at the bend 1506 in a plane (x-z plane as shown) comprising the bend 1506 of the film lightguide 1507 has a subtended angle 1505 from the midpoint 1504 of the line 1513 (shown dashed) between a point 1509 on the inner surface 1510 of the film lightguide 1507 at the start of the bend 1506 and the point 1503 on the inner surface 1510 of the film lightguide 1507 at the end of the bend 1506. In this embodiment, the subtended angle 1505 is 180 degrees and the radius of curvature 1511 of the surface 1501 of the guide 1502 adjacent the inner surface 1510 of the film lightguide 1507 in the plane (x-z plane) comprising the bend 1506 is greater than the thickness 1412 of the reflective spatial light modulator 1408.

Figure 16:
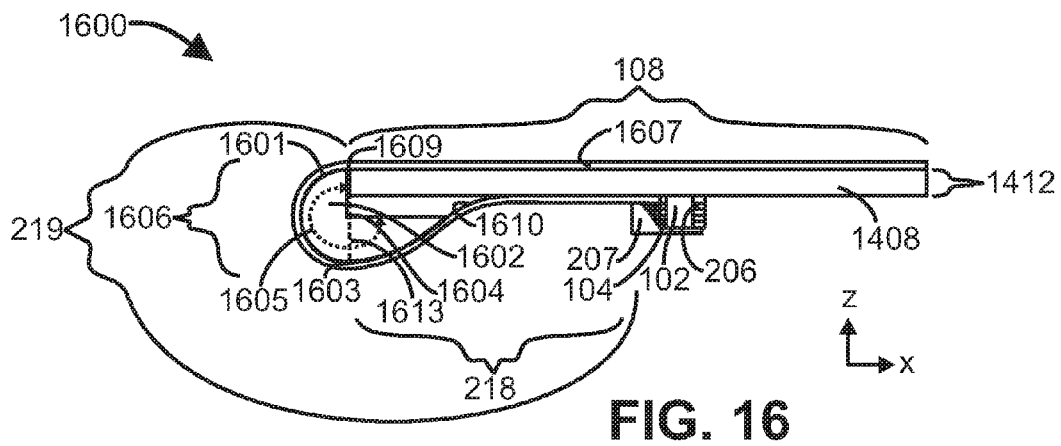
FIG. 16 is a side view of one embodiment of a reflective display with a film lightguide and a guide with a guide surface adjacent a surface of the film lightguide with an subtended angle of 270 degrees.

FIG. 16 is a side view of one embodiment of a reflective display 1600 including a film lightguide 1607 operatively coupled to a reflective spatial light modulator 1408. A plurality of coupling lightguides 104 extend from the film lightguide 1407 and are folded and stacked such that their ends 206 are positioned to receive light from the light source 102. A relative position maintaining element 207 substantially maintains the relative position of the coupling lightguides 104. The film lightguide 1607 includes a first bend 1606 in the light mixing region 219 such that a portion 218 of the light mixing region 219 is positioned behind the light emitting region 108 of the film lightguide 1607 and reflective spatial light modulator 1408. A guide 1602 is positioned within the first bend 1606 such that a first curved surface 1601 of the guide 1602 is adjacent the inner surface 1610 of the film lightguide 1607. In this embodiment, the curved surface 1601 of the guide 1602 adjacent the inner surface 1610 of the film lightguide 1607 at the bend 1606 in a plane (x-z plane as shown) comprising the bend 1606 of the film lightguide 1607 has a subtended angle 1605 from the midpoint 1604 of the line 1613 (shown dashed) between a point 1609 on the inner surface 1610 of the film lightguide 1607 at the start of the bend 1606 and the point 1603 on the inner surface 1610 of the film lightguide 1607 at the end of the bend 1606. In this embodiment, the subtended angle 1605 is 270 degrees.

Exemplary embodiments of light emitting devices and methods for making or producing the same are described above in detail. The devices, components, and methods are not limited to the specific embodiments described herein, but rather, the devices, components of the devices and/or steps of the methods may be utilized independently and separately from other devices, components and/or steps described herein. Further, the described devices, components and/or the described methods steps can also be defined in, or used in combination with, other devices and/or methods, and are not limited to practice with only the devices and methods as described herein.

While the disclosure includes various specific embodiments, those skilled in the art will recognize that the embodiments can be practiced with modification within the spirit and scope of the disclosure and the claims.

EQUIVALENTS

Those skilled in the art will recognize, or be able to ascertain using no more than routine experimentation, numerous equivalents to the specific procedures described herein. Such equivalents are considered to be within the scope of the disclosure. Various substitutions, alterations, and modifications may be made to the embodiments without departing from the spirit and scope of the disclosure. Other aspects, advantages, and modifications are within the scope of the disclosure. This disclosure is intended to cover any adaptations or variations of the specific embodiments discussed herein. Therefore, it is intended that this disclosure be limited only by the claims and the equivalents thereof.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein. Unless indicated to the contrary, all tests and properties are measured at an ambient temperature of 25 degrees Celsius or the environmental temperature within or near the device when powered on (when indicated) under constant ambient room temperature of 25 degrees Celsius.

What is claimed is:

1. A display comprising:
  a light source;
  a spatial light modulator with a first outer surface and an active area;
  a film including a body having an inner surface and an opposing outer surface in a thickness direction of the film, the body of the film comprising a light emitting region defined by a plurality of light extracting features, the light emitting region is positioned adjacent the active area of the spatial light modulator in the thickness direction and is substantially parallel to the first outer surface of the spatial light modulator;
  a light input region of the film configured to receive light emitted from the light source;
  a light mixing region of the film positioned along the film between the light input region and the light emitting region such that the light emitted from the light source propagates by total internal reflection from the light input region, through the light mixing region, and into the light emitting region in a total internal reflection condition, wherein the light extracting features redirect a portion of the light out of the film in the light emitting region toward the spatial light modulator; and
  a guide element positioned along a first edge of the spatial light modulator, the guide element having a surface curved in a first plane comprising the thickness direction of the film, wherein
    the film is folded along the curved surface of the guide element at a first fold in the first plane such that the first fold positions a portion of the light mixing region above or below the active area of the spatial light modulator in the thickness direction;
    the light mixing region comprises the first fold; and
    the inner surface of the film in the light mixing region is curved along the curved surface of the guide element at the first fold and is in contact with the curved surface at the first fold.

2. The display of claim 1 wherein the curved surface of the guide element subtends an angle greater than 90 degrees at the first fold.

3. The display of claim 2 wherein the cross-sectional shape in the first plane of the curved surface of the guide element at the first fold comprises all or a portion of an ellipse or circle.

4. The display of claim 2 wherein the curved surface of the guide element has an average radius of curvature in the first plane at the first fold less than 2 millimeters.

5. The display of claim 1 wherein the inner surface of the film along the curved surface of the guide element at the first fold comprises a radius of curvature that is not less than a radius of curvature of the curved surface of the guide element at the first fold.

6. The display of claim 5 wherein the film comprises a core layer and a cladding layer, the emitted light from the light source propagates by total internal reflection in the core layer, and the curved surface of the guide element has an average radius of curvature in the first plane at the first fold greater than 4 times an average thickness of the core layer at the first fold.

7. The display of claim 1 wherein the curved surface of the guide element subtends an angle greater than 45 degrees at the first fold.

8. The display of claim 1 wherein the curved surface of the guide element subtends an angle between 80 degrees and 270 degrees at the first fold.

9. The display of claim 1 wherein the curved surface of the guide element has an average radius of curvature in the first plane at the first fold greater than 0.5 times a thickness of the spatial light modulator in the first plane.

10. The display of claim 1 wherein the film comprises a core layer and a cladding layer, the emitted light from the light source propagates by total internal reflection in the core layer, and the cladding layer is positioned between the core layer and the spatial light modulator.

11. The display of claim 10 wherein the cladding layer comprises an adhesive that adheres the light mixing region of the film to the guide element at the first fold.

12. The display of claim 1 wherein the film further includes a plurality of coupling lightguide strips extending from the light mixing region of the film, the coupling lightguides strips are folded and stacked such that ends of the folded and stacked coupling lightguide strips define the light input region.

13. The display of claim 1 wherein the light source is positioned above or below the active area of the spatial light modulator in the thickness direction.

14. The display of claim 1 wherein a cross-section of the guide element at the curved surface of the guide element at the fold in the first plane is substantially constant in a direction perpendicular to the first plane.

15. The display of claim 1 wherein the guide element has a length along the first edge of the spatial light modulator orthogonal to the first plane that is greater than 3 times a width of the guide element in the first plane.

16. A display comprising:
a light source;
a reflective spatial light modulator with a first outer surface and an active area;
a film including a body having an inner surface and an opposing outer surface in a thickness direction of the film, the body of the film comprising a light emitting region defined by a plurality of light extracting features, the light emitting region is positioned above the active area of the reflective spatial light modulator in the thickness direction;
a light input region of the film configured to receive light emitted from the light source;
a light mixing region of the film positioned along the film between the light input region and the light emitting region such that the light emitted from the light source propagates by total internal reflection from the light input region, through the light mixing region, and into the light emitting region, wherein the light extracting features redirect a portion of the light out of the film in the light emitting region toward the reflective spatial light modulator; and
a guide element positioned along a first edge of the reflective spatial light modulator, the guide element having a surface curved in a first plane comprising the thickness direction of the film, wherein
the film is folded along the surface of the guide element at a first fold in the first plane such that the first fold positions a portion of the light mixing region below the active area of the spatial light modulator in the thickness direction;
the light mixing region comprises the first fold; and
the inner surface of the film in the light mixing region is curved along the curved surface of the guide element at the first fold.

17. The display of claim 16 wherein the curved surface of the guide element subtends an angle greater than 90 degrees at the first fold and has an average radius of curvature in the first plane at the first fold less than 2 millimeters.

18. A method of making a display comprising:
a) forming a film including a body having an inner surface and an opposing outer surface in a thickness direction of the film, the body of the film comprising a light emitting region defined by a plurality of light extracting features and a light mixing region adjacent the light emitting region along the film;
b) positioning the light emitting region of the film adjacent an active area of the spatial light modulator in the thickness direction and substantially parallel to the first outer surface of the spatial light modulator;
c) positioning a light source to emit light into a light input region of the film such that the light emitted from the light source passes through the light mixing region of the film and into the light emitting region in a total internal reflection condition, wherein the light extracting features redirect a portion of the light out of the film in the light emitting region toward the spatial light modulator;
d) positioning a guide element along a first edge of the spatial light modulator, the guide element having a surface curved in a first plane comprising the thickness direction of the film; and
e) folding the light mixing region of the film along the curved surface of the guide element at a first fold in the first plane such that the folding positions a portion of the light mixing region above or below the active area of the spatial light modulator in the thickness direction.

19. The method of claim 18 wherein folding the light mixing region comprises bending the inner surface of the film in the light mixing region along the curved surface of the guide element at the first fold such that the inner surface is in contact with the curved surface of the guide element at the first fold.

20. The method of claim 18 wherein the spatial light modulator is a reflective spatial light modulator, positioning the light emitting region of the film positions the light emitting region above the reflective spatial light modulator in the thickness direction, and folding the light mixing region positions a portion of the light mixing region below the active area of the spatial light modulator in the thickness direction.

* * * * *